United States Patent
Tadayon et al.

(10) Patent No.: US 9,336,213 B2
(45) Date of Patent: May 10, 2016

(54) ACTIVE FILE SYSTEM

(76) Inventors: Valiyolah Tadayon, Cincinnati, OH (US); Charles M. Zwick, Cincinnati, OH (US); Patrick B. Osterday, Cincinnati, OH (US); James Edward Wilson, Cincinnati, OH (US)

( * ) Notice: Subject to any disclaimer, the term of this patent is extended or adjusted under 35 U.S.C. 154(b) by 776 days.

(21) Appl. No.: 12/249,081

(22) Filed: Oct. 10, 2008

(65) Prior Publication Data

US 2009/0070291 A1    Mar. 12, 2009

Related U.S. Application Data

(63) Continuation of application No. 10/831,018, filed on Apr. 22, 2004, now Pat. No. 7,444,390, which is a continuation of application No. 09/944,663, filed on Aug. 31, 2001, now abandoned, which is a continuation-in-part of application No. 09/421,808, filed on Oct. 20, 1999, now abandoned.

(60) Provisional application No. 60/156,676, filed on Sep. 29, 1999.

(51) Int. Cl.
    *G06F 17/30*    (2006.01)
(52) U.S. Cl.
    CPC ...... *G06F 17/30067* (2013.01); *G06F 17/3007* (2013.01)
(58) Field of Classification Search
    CPC .................................................. G06F 17/3007
    USPC .................................................. 709/219, 244
    See application file for complete search history.

(56) References Cited

U.S. PATENT DOCUMENTS

| | | |
|---|---|---|
| 5,721,909 A | 2/1998 | Oulid-Aissa et al. |
| 5,737,536 A | 4/1998 | Herrmann et al. |
| 5,771,354 A | 6/1998 | Crawford |
| 5,813,009 A | 9/1998 | Johnson et al. |
| 5,822,780 A | 10/1998 | Schutzman |
| 5,826,253 A | 10/1998 | Bredenberg |
| 5,862,325 A * | 1/1999 | Reed et al. .................... 709/201 |
| 5,864,871 A | 1/1999 | Kitain et al. |
| 5,917,489 A | 6/1999 | Thurlow et al. |
| 5,946,700 A | 8/1999 | Pongracz et al. |

(Continued)

OTHER PUBLICATIONS

Fraternali et al, A Structured Approach for the Definition of the Semantics of Active Databases, ACM Transactions on Database Systems (TODS), vol. 20, Issue 4, Dec. 1995, pp. 414-471.

(Continued)

*Primary Examiner* — Asghar Bilgrami
(74) *Attorney, Agent, or Firm* — Baker & Hostetler LLP

(57) ABSTRACT

A computerized file system is accessible over the Internet or other type of network, in which certain "triggering events" pertaining to the operation of the file system automatically generate a notification message to users. Once a user has been authenticated, this user's access rights are determined. An Automatic Notification function checks to see if any "triggering" events have occurred when a user performs a particular task. The Automatic Notification function defines what type of event will become a triggering event, and also defines what will be the triggering action, once the triggering event occurs, and stores this information in a database. The Auto-notification function can comprise programs that are launched to perform certain tasks. The precise type of auto-notification message is fully configurable for each component in the file system.

1 Claim, 16 Drawing Sheets

(56) References Cited

U.S. PATENT DOCUMENTS

| | | | |
|---|---|---|---|
| 5,974,563 | A | 10/1999 | Beeler, Jr. |
| 5,999,978 | A | 12/1999 | Angal et al. |
| 6,006,228 | A | 12/1999 | McCollum et al. |
| 6,009,427 | A | 12/1999 | Wolff |
| 6,021,433 | A | 2/2000 | Payne et al. |
| 6,085,199 | A | 7/2000 | Rose |
| 6,185,555 | B1 | 2/2001 | Sprenger et al. |
| 6,185,574 | B1 | 2/2001 | Howard et al. |
| 6,202,066 | B1 | 3/2001 | Barkley et al. |
| 6,253,217 | B1 | 6/2001 | Dourish et al. |
| 6,308,179 | B1 | 10/2001 | Petersen et al. |
| 6,314,425 | B1 | 11/2001 | Serbinis et al. |
| 6,341,314 | B1 | 1/2002 | Doganata et al. |
| 6,381,613 | B1 | 4/2002 | Gallery et al. |
| 6,393,420 | B1 | 5/2002 | Peters |
| 6,517,587 | B2 | 2/2003 | Satyavolu et al. |
| 6,594,675 | B1 | 7/2003 | Schneider |
| 6,769,009 | B1 * | 7/2004 | Reisman ................... 709/201 |
| 6,826,692 | B1 | 11/2004 | White |
| 7,100,195 | B1 * | 8/2006 | Underwood ................... 726/2 |
| 2001/0003829 | A1 | 6/2001 | Romine |
| 2001/0052058 | A1 | 12/2001 | Ohran |
| 2002/0055958 | A1 | 5/2002 | Edwards et al. |
| 2002/0059325 | A1 | 5/2002 | Beizer et al. |
| 2002/0083030 | A1 | 6/2002 | Yang et al. |
| 2003/0014421 | A1 | 1/2003 | Jung |
| 2003/0097361 | A1 | 5/2003 | Huang et al. |
| 2004/0249902 | A1 | 12/2004 | Tadayon et al. |

OTHER PUBLICATIONS

Koch et al, Beyond Web Technology—Lessons Learnt from BSCW, http://bscw.fit.fraunhofer.de/Papers/wetice98/index.html, printed Aug. 26, 2004.

* cited by examiner

| Username (Space Used/Limit) | View Files | Edit User | Delete User |
|---|---|---|---|
| admin (167,964/0) | 🔍 | ⊘ | ⊘ |
| guest (0/0) | 🔍 | 👤 | ⊘ |
| public (0/0) | 🔍 | 👤 | ⊘ |
| suggestionbox (131/120,000) | 🔍 | 👤 | ✕ |
| user1 (9,771/800,000) | 🔍 | 👤 | ✕ |
| user2 (0/1,000) | 🔍 | 👤 | ✕ |
| user3 (0/1,000) | 🔍 | 👤 | ✕ |
| user4 (0/987) | 🔍 | 👤 | ✕ |

Site Total: (177,866 Bytes)
Site Limit: (1,000,000 Bytes)

* Bold denotes administrator priviledge.
* Gray denotes account is disabled.

[Create New User]  [Back to Startup Screen]

Options

▣ Customize Screen Resolution

🗝 Change Password

📝 Provide Feedback on FileDelivery™

🏠 Set my startup screen to the Options screen

↶ Take me back to the getting started guide

🚪 Add your site to your Favorites

FIG. 7

ACTIVE FILE SYSTEM

CROSS-REFERENCE TO RELATED APPLICATIONS

This application is a continuation of U.S. Nonprovisional patent application Ser. No. 10/831,018, entitled "METHOD AND APPARATUS FOR PROVIDING A WEB-BASED ACTIVE VIRTUAL FILE SYSTEM," filed on Apr. 22, 2004, now U.S. Pat. No. 7,444,390, which was a continuation of U.S. Nonprovisional patent application Ser. No. 09/944,663, entitled "METHOD AND APPARATUS FOR PROVIDING A WEB-BASED ACTIVE VIRTUAL FILE SYSTEM," filed on Aug. 31, 2001, now abandoned which was a continuation-in-part application of U.S. Nonprovisional patent application Ser. No. 09/421,808, entitled "METHOD AND APPARATUS FOR PROVIDING A WEB-BASED ACTIVE VIRTUAL FILE SYSTEM," filed on Oct. 20, 1999, now abandoned which claimed priority to U.S. Provisional Patent Application Ser. No. 60/156,676, entitled, "METHOD AND APPARATUS FOR PROVIDING A WEB-BASED ACTIVE VIRTUAL FILE SYSTEM," filed on Sep. 29, 1999, the disclosures of which are hereby incorporated by reference.

TECHNICAL FIELD

The present invention relates generally to computerized file servers and is particularly directed to a file server of the type that automatically sends a notification message upon the occurrence of a predetermined triggering event. The invention is specifically disclosed as a web-based active virtual file system that controls the access rights of users to files stored on the file server of the active virtual file system, while providing an automatic notification E-mail message to predetermined users when a triggering event occurs, such as the uploading of a file onto the file server.

BACKGROUND OF THE INVENTION

FIG. 1 shows a conventional filing system generally designated by the reference numeral 10 that is accessible by users over a network. A first user at 20 is connected to an Internet Service Provider (ISP) at 30, in which this first user has a browser software package on his or her computing platform, as well as a graphical user interface operating system, such as WINDOWS or MACINTOSH. A second user at 22 has a similar computing platform containing a browser and a graphical user interface operating system, and this user is connected to a second Internet Service Provider (ISP) at 32. Both of these ISP's 30 and 32 are connected to the Internet, which is generally designated by the reference numeral 35.

A central file system is generally designated by the reference numeral 50, which contains a conventional file server operating system and at least one hard disk drive at 52. The file system 50 represents the main core of an Internet web site, which is connected to the Internet 35 via a web server 40 and a user interface software package 42. In typical Internet web site systems, both users 20 and 22 can simultaneously be connected through web server 40, user interface module 42, and to the file system 50, and can simultaneously access various web pages of this web site.

A third user at 24 is connected to a local area network (LAN) using a LAN input-output module, and where the LAN itself is generally designated by the reference numeral 45. A fourth user 26 also is connected to the LAN via a separate LAN input-output module. The LAN 45 is directly connected into the file system 50, and users 24 and 26 will have access to files stored on the hard disk drive, via the server operating system at 52. Some of these files may contain displays that are either similar or identical to those displays made available through the Internet 35 to users 20 and 22.

When a user attempts to log into file system 50, that user must provide sufficient authentication information before the file server 50 will allow that user write or read/write access to any of the files stored on the hard disk drive at 52. A user Authentication module 60 is provided, which typically is in the form of a user login name and a user-specific password.

Once the user has been authenticated, the file system 50 will determine what access rights this particular user will have to any of the files or displays residing on the hard disk drive at 52. This user's access rights are determined by use of an "Access Rights" module at 62. Such rights typically include the right to "read" a file stored within the file system 50, and to potentially "write" to a file also stored on file system 50. In most circumstances, if a user has the right to write to a particular file, that user will also have the right to read that same file, although these particular rights can be different and separate for any given file.

A User Management module 64 is also provided for file system 50, in which new users can be created, existing users can be deleted or otherwise edited, wherein these functions can be performed by the systems administrator. In addition, the user himself or herself can typically perform certain functions, such as changing a password or potentially even deleting oneself from the system as a user altogether. The User Management module 64 could also be fully automatic, such as in the circumstance of certain Internet web sites that allow users to essentially create themselves as being associated with that web site, under the control of software (such as the "User Management module") at the web site.

A network file system known as "NFS," similar to the filing system 50 on FIG. 1, can mount remote file systems across homogenous and heterogeneous systems. The NFS consists of a client and server systems. An NFS server can export local directories for remote NFS clients to use. NFS runs over IP (Internet Protocol) using universal datagram protocol. There are NFS implementations that will work using TCP (Transmission Control Protocol) as the network transport service. NFS was originally developed by Sun Microsystems Computer Corporation, and is now part of their Open Network Computing (ONC) initiative. NFS has been accepted by the IETF (Internet Engineering Task Force) in certain RFC's (Requests for Comment) as a standard for file services on TCP/IP networks on the Internet.

CIFS is a proposed protocol that defines a standard remote file system access protocol for use over the Internet, which enables groups of users to work together and share documents across the Internet or within their own corporate intranets. While not yet finalized, CIFS is designed as an open cross-platform technology based on the native file-sharing protocols built into Microsoft WINDOWS and other popular personal computer operating systems, and probably will be supported on dozens of other platforms, including UNIX. CIFS is proposed to be an enhanced version of Microsoft's open, cross-platform Server Message Block (SMB) protocol, the native file-sharing protocol in the Microsoft WINDOWS 95, WINDOWS NT, and OS-2 operating systems, and may become the standard way that millions of personal computer users share files across corporate intranets.

Another existing protocol is WEBNFS, which is implemented by Sun Microsystems and which allows accessing NFS shares using Web browsers. The shortcoming of this protocol is that it needs support in the browser, but is not supported in the most of today's existing browsers.

While the above-described NFS and CIFS systems have done much to help standardize the sharing of files in distributed file systems, they do not provide any type of notification functions to users or groups of users when certain accessing events occur. In these conventional systems, if the first user modifies a particular file, only that first user is aware of this modification. A second user who may also have access to that same file would not be made aware of any such modifications, at least not without knowing the time and date stamps of previous saves of that same file.

INTRODUCTION TO THE INVENTION

Accordingly, it is a primary advantage of the present invention to provide a distributed file system that allows access to files by remote authorized users, and upon such access provides an Automatic Notification message to predetermined users having an appropriate interest in that particular file. It is another advantage of the present invention to provide a distributed filed system that is web-based so as to allow remote users to use standard web browser software to access files in a central active virtual file system, and upon such accessing, the active virtual file system provides an Automatic Notification message to predetermined users having an appropriate interest in that file. It is a yet further advantage of the present invention to provide a web-based active virtual file system that allows remote users to access certain files, and upon supported on dozens of other platforms, including UNIX. CIFS is proposed to be an enhanced version of Microsoft's open, cross-platform Server Message Block (SMB) protocol, the native file-sharing protocol in the Microsoft WINDOWS 95, WINDOWS NT, and OS-2 operating systems, and may become the standard way that millions of personal computer users share files across corporate intranets.

Another existing protocol is WEBNFS, which is implemented by Sun Microsystems and which allows accessing NFS shares using Web browsers. The shortcoming of this protocol is that it needs support in the browser, but is not supported in the most of today's existing browsers.

While the above-described NFS and CIFS systems have done much to help standardize the sharing of files in distributed file systems, they do not provide any type of notification functions to users or groups of users when certain accessing events occur. In these conventional systems, if the first user modifies a particular file, only that first user is aware of this modification. A second user who may also have access to that same file would not be made aware of any such modifications, at least not without knowing the time and date stamps of previous saves of that same file.

INTRODUCTION TO THE INVENTION

Accordingly, it is a primary advantage of the present invention to provide a distributed file system that allows access to files by remote authorized users, and upon such access provides an Automatic Notification message to predetermined users having an appropriate interest in that particular file. It is another advantage of the present invention to provide a distributed filed system that is web-based so as to allow remote users to use standard web browser software to access files in a central active virtual file system, and upon such accessing, the active virtual file system provides an Automatic Notification message to predetermined users having an appropriate interest in that file. It is a yet further advantage of the present invention to provide a web-based active virtual file system that allows remote users to access certain files, and upon such access triggers an Automatic Notification message to other predetermined users having an appropriate interest in that file. It is still another advantage of the present invention to provide a web-based active virtual file system that can be configured to run programs, enforce constraints, send notifications, and perform other functions using predetermined rules that enable the active virtual file system to be used in workflow automation. It is yet a further advantage of the present invention to provide a web-based active virtual file system that can be programmed by the systems administrator to accomplish tasks needed for E-commerce and in setting up sophisticated intranet and Internet solutions, in which the active virtual file system provides triggers that automatically notify predetermined users having an interest in files that are being uploaded to or downloaded from the active virtual file system.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved computerized file system is provided that is accessible by users over the Internet, or via a local area network (LAN) or wide area network (WAN). The Internet users typically operate personal computer platforms having a web browser software program that communicates with an Internet Service Provider (ISP), which launches the users onto the Internet itself. On the other end of the Internet, a web server located near the computerized file system of the present invention receives messages from the users, and transmits messages back to those users as they "logon" to the file system. The LAN users typically operate personal computer or workstation platforms that are directly connected to a local area network (LAN), which in turn is connected into the web server at the computerized file system's site. These LAN users will also preferably have a web browser-type software program that is in communication over the LAN with the web server near the computerized file system of the present invention.

The web server is connected to a user interface that presents a "folder" window to the user, in the form of a Java tree structure. The user interface also is in communication with a web-based active virtual file system (which is also referred to as a "WAVFS") that contains a network server operating system, which includes at least one hard disk drive and a database. It is preferred that all users, regardless of their particular physical communications link to the WAVFS platform, be able to access the active virtual file system of the present invention by use of a web browser resident on the users' own computer platform. The WAVFS operating system may operate as a stand-alone system, or may be resident on top of a different architecture, or on top of other applications running on the same computing platform.

When a user initially communicates to the WAVFS distributed file system, it must be determined whether or not that user has any right to be logged into the file system. An "Authentication" function makes this determination. Once the user has been properly authenticated, this user's access rights must now be determined, and the WAVFS uses an "Access Rights" function for this purpose, which inspects information previously stored in the WAVFS pertaining to this particular user. This information essentially determines whether or not a user has the right to either read or write, or both read and write, a particular file that already resides on the active virtual file system's hard disk drive. These access rights also determine whether or not a user will be able to upload a new file onto the hard disk drive of the WAVFS. Authorized users optionally can seamlessly encrypt their data when uploading files uploading files to the WAVFS.

Other functions that are available to the active virtual file system 150 include a "User Management" function and a "Group Management" function, which allow the WAVFS systems administrator to add, delete, or edit users and their attributes (at the User Management function), and to also group various users in predetermined ways (using the Group Management function). The User Management and Group Management functions also allow importing users/groups from other systems, such as UNIX password/group files, or from other systems such as NIS, NT or Novell operating systems.

The main kernel logic of the preferred WAVFS operates at a level only as low as "folders" (i.e., "directories"), and individual files and application programs are controlled at a different level by a different functional application. A "Modules" function contains logic that controls the appearance of the screens at the user's monitor, and command choices at the user's monitor screen are provided at appropriate times. The Modules function manages the files of a folder—and therefore, can control individual files—and also contain applications (such as word processors and spreadsheet computer programs). The Modules function also controls "objects." With reference to the present invention, a file is an example of an object, and an event is another example of an object. An application program can also be an object.

One important function associated with the active virtual file system is its "Automatic Notification" function, which provides the capability of making the WAVFS an "active" file system. The Automatic Notification function checks to see if any "triggering" events have occurred when a user performs a particular task. Such a triggering event could be merely the opening or downloading of a file on the hard disk drive, or more importantly, the saving (or uploading) of a file on the hard disk drive of the WAVFS. The Automatic Notification function defines what exact type of event will become a triggering event. Furthermore, the Automatic Notification function also defines what will be the triggering action, once the triggering event occurs. All of this information preferably is stored in the database, in which all of the defining triggering events and triggering actions are preferably held in a single large table of the database.

The active aspects of the WAVFS of the present invention work completely outside any database program and instead concentrate on the file system itself to both monitor and control certain actions by users, and then provide for the Automatic Notification function to perform a predetermined task upon the occurrence of such predetermined actions by these users. The Automatic Notification function has the capability to send messages automatically to other users that have an interest in a particular file that undergoes certain activities, which are predetermined by the systems administrator. There is complete flexibility as to just what events can be specified as becoming a "triggering event," and there is complete flexibility as to "who" receives an Automatic Notification message. The Automatic Notification messages would normally be sent to users who are grouped in some logical (or at least predetermined) manner, according to the Group Management function.

Triggering events could be more complex than simple file operations, and for example, such "complex events" could comprise a sequence of "simple events." These complex events (as triggering events) are completely programmable, and their resulting actions can be similarly "complex" from the standpoint that they are also completely programmable, and further are able to launch completely separate application programs. Moreover, the "complex actions" that can be programmed using the WAVFS may launch application programs to both LAN users (without use of the Internet) and to WAN users (including those connected via the Internet).

In the preferred embodiment, these Automatic Notification messages are transmitted via E-mail technology. By use of E-mail-type messages, the notification process can be initiated simultaneously for all users who are to receive any such notification message. The use of E-mail technology provides certain advantages, such as balancing the loading of the network traffic. This allows users to come to the file, rather than sending the file to all of the users. In the preferred mode of operation of the WAVFS, a "Files" module is provided to combine World Wide Web technology and E-mail technology to allow users to seamlessly upload and download files to and from WAVFS folders over the Internet. When a new file becomes available for a user to either download or view, the WAVFS provides an Automatic Notification message to the appropriate users via E-mail technology. Furthermore, an Auto-notification message is sent to predetermined users and/or the systems administrator when a user has uploaded a file onto the WAVFS.

As an alternative to E-mail technology, the Automatic Notification function of the present invention could be implemented by a rules-based system that could, for example, automatically execute other computer programs upon the occurrence of the triggering event, or implemented by use of the triggering features of an active database computer program, such as ORACLE or DB2.

As noted above, the Auto-notification function can comprise other programs that are launched to perform certain tasks. The precise type of auto-notification is fully configurable for each component in the preferred WAVFS. All Auto-notification messages contain links to the WAVFS, and the link will open the user's web browser and take the user directly to the folder or object that was just triggered.

One other unique aspect of the preferred WAVFS of the present invention is the fact that more than one single file can be stored having the same virtual filename, at least the same filename as far as the individual users are concerned. The actual filename on the WAVFS is stored in a "Files Table," and a link to that file is stored in the WAVFS. When a user uploads a file to the WAVFS, the file is physically stored on the hard disk drive of the server. The location or directory is based upon a setting in the database and also the username of the virtual folder where the file is being uploaded to. If a file already exists having the same filename, a unique filename is generated for that file, at least with respect to the WAVFS server operating system. The user does not see this unique filename, but instead is only shown the "Display Name" of the file that is stored in the database. This "Display Name" is the filename that was selected for uploading.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 5 illustrates a computer display screen depicting the User Management functions available to a systems administrator, as according to the web-based active virtual file system of FIG. 2.

FIG. 7 illustrates a computer display screen depicting some of the options available to a user, as opposed to a systems administrator, using the web-based active virtual file system of FIG. 2.

DETAILED DESCRIPTION OF THE EXEMPLARY EMBODIMENTS

Reference will now be made in detail to the present preferred embodiment of the invention, an example of which is illustrated in the accompanying drawings, wherein like numerals indicate the same elements throughout the views.

In order to better describe the present invention, a definition of certain terms is provided immediately below:

Database—a large collection of data organized in a manner to facilitate quick retrieval.

Active Database—a database that includes a management system that can automatically react to events, such as database transactions, time events, and external signals that trigger the evaluation of a condition; and if the condition evaluates to be true, a specific action is carried out.

Traditional Database—a database system that is passive in behavior, which either periodically polls the database, or embeds or encodes event detection and execution of related action in the application code.

Field—an area of a database record into which a particular item of data is stored.

File—a block of information that is stored on a computerized electronic storage device; in typical installations, a file has an associated "filename."

Folder—an organizational unit that houses objects (including files) and other folders; sometimes also referred to as a directory in a disk operating system.

Internet—a set of networks interconnected with routers.

Module—a segment of code written to certain specifications to perform a specific function, which allows for the creation, modification, or deletion of a specific object that the module was created for.

Network—an interconnected group of computers that connect to and cooperate with each other.

Object—a single entity of a specific type of information. As an example, a file is an object, and an event is an object.

Operating System—software that controls the operation of a computer, including the organization of its memory components, such as a hard disk drive.

Packet—a unit of data sent across a network.

Physical Storage—a medium onto which data can be entered, in which it can be contained (i.e., stored) and from which it can be retrieved at a later time; examples include a hard disk, semiconductor memory (e.g., RAM, ROM, EPROM, EEPROM, NVRAM), compact disc, etc.

Record—an ordered set of fields; a row in a database table.

Router—a device that forwards packets between networks.

Table—a collection of records in a database.

Web Browser—a program that allows a person to read hypertext.

Figure 2:
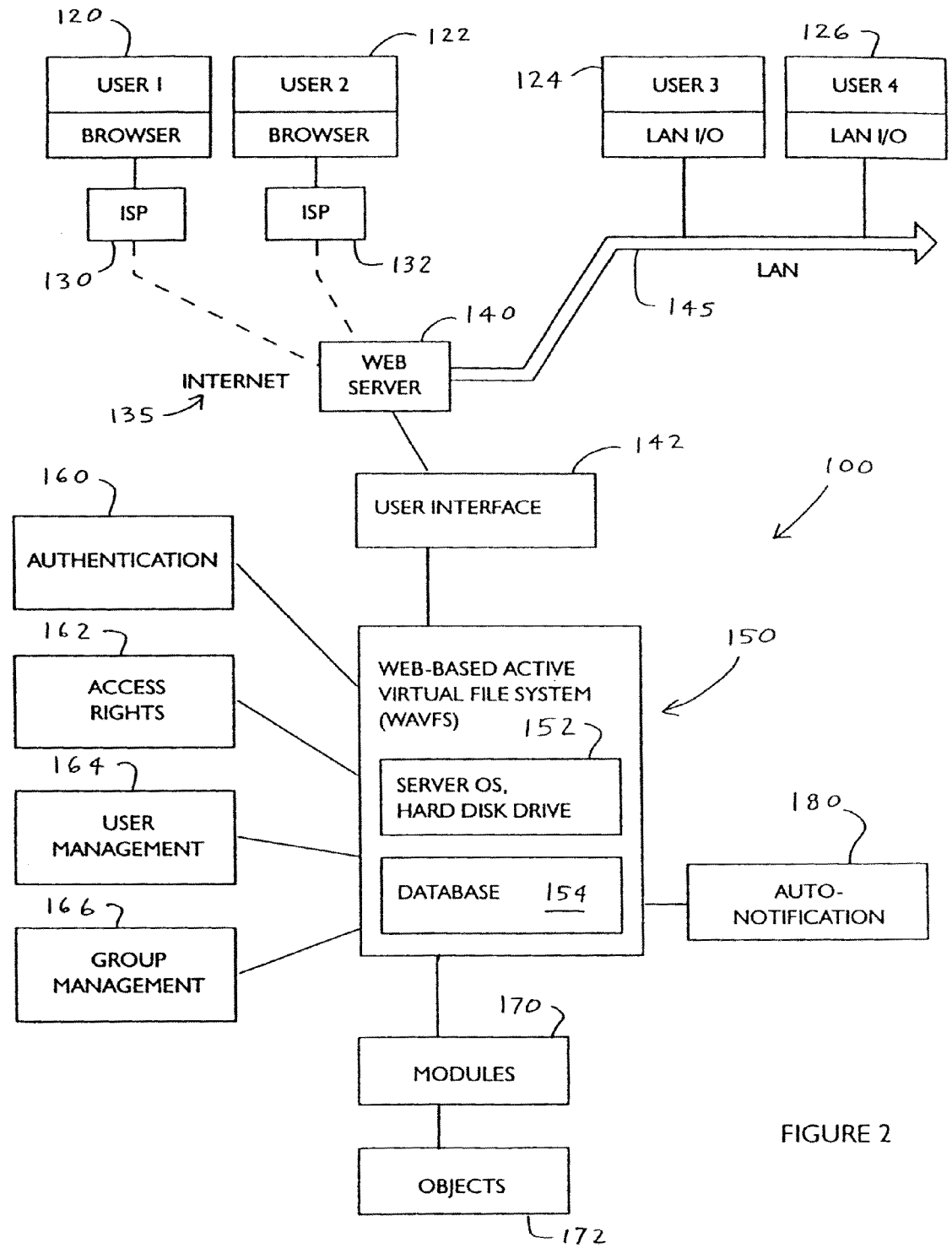
FIG. 2 is a block diagram depicting a web-based active virtual file system that can be accessed by users over a LAN or via the Internet, as constructed according to the principles of the present invention.

Referring now to the drawings, FIG. 2 illustrates the major building blocks of a computerized file system that is accessible by users over the Internet or via a local area network (LAN), in which this system is generally designated by the reference numeral 100. A first user at 120 operates a personal computer platform having a web browser software program, and this browser is in communication with an Internet Service Provider (ISP) 130. Preferably, the computer platform of the first user 120 additionally contains a graphical user interface operating system, such as WINDOWS or MACINTOSH. A second user at 122 similarly has a computer platform with a web browser software program which is in communication with another ISP 132, and a graphical user interface operating system. This second user 122 could have an entirely different type of platform, as compared to the first user 120, such as a MACINTOSH or a UNIX-based workstation, or even a hand-held computer.

Both ISP's 130 and 132 are connected to the Internet, which is generally designated by the reference numeral 135.

The Internet is also used for communications to a web server 140, which is located near the computerized file system of the present invention.

Figure 1:
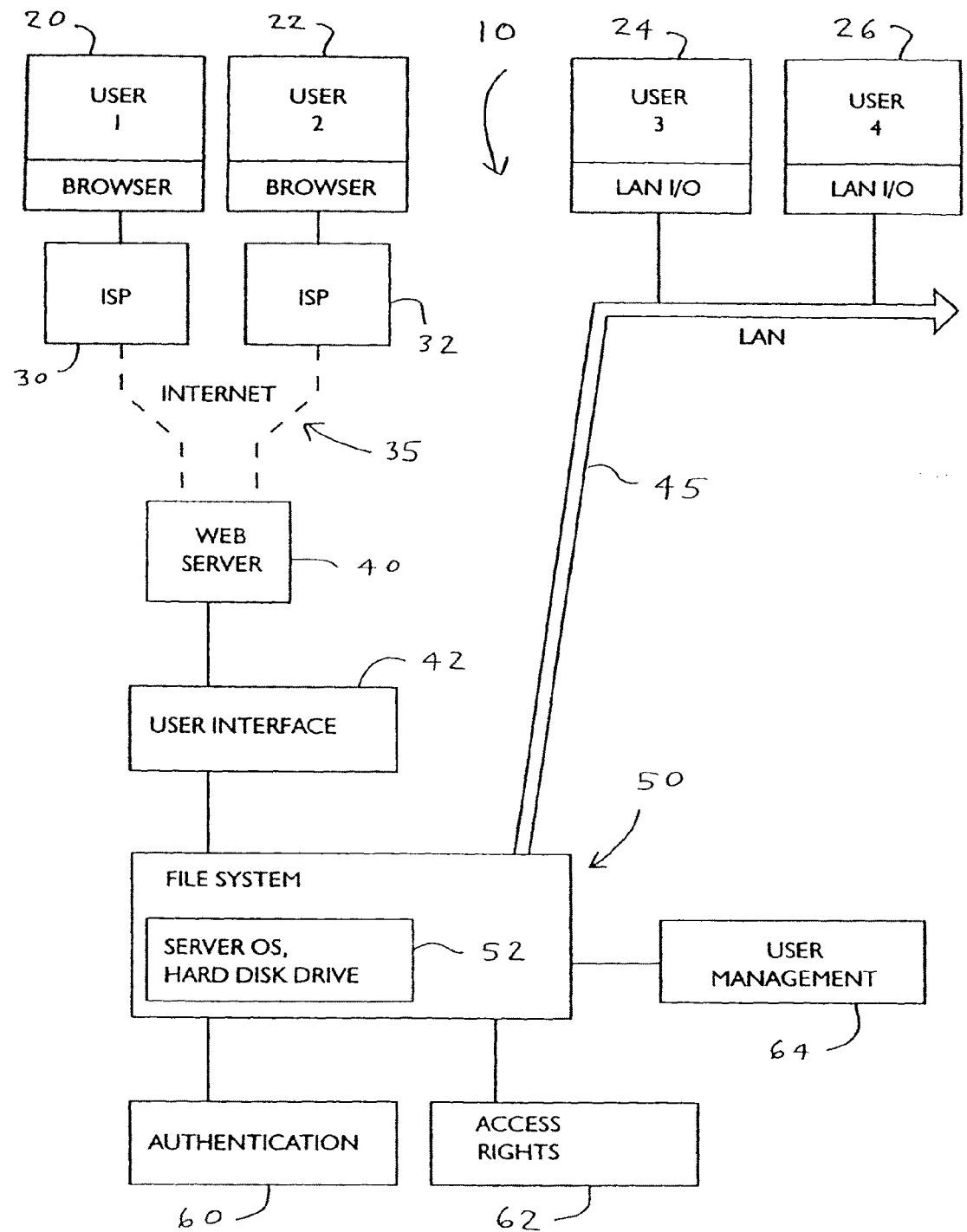
FIG. 1 is a block diagram of a conventional file system that can be accessed by users over a LAN or via the Internet, as known in the prior art.

A third user at 124 also uses a personal computer or a workstation platform, and is connected to a local area network (LAN) 145 via a LAN input/output module. A fourth user at 126 is similarly connected to LAN 145 by use of a LAN input/output module. As opposed to conventional systems, the LAN 145 is connected to the web server module at 140, rather than being directly connected into the network file system (as was the case in FIG. 1, where LAN 45 was directly connected to the file system 50).

It is preferred that the third and fourth users at 124 and 126 additionally have a web browser-type software program that is in communication with web server 140 over the LAN, and further utilize a graphical user interface operating system, such as WINDOWS or MACINTOSH, or a UNIX-based graphical user interface, for example. The web browser functionality of these user platforms at 124 and 126 provide certain advantages when used with the active virtual file system 150 of the present invention, as discussed below in greater detail.

Web server 140 is connected to a user interface 142. User interface 142 is used to present a "folder" window to the user, which in the present form is a Java tree-type structure, as seen on FIG. 4 by the folder window 260.

User interface 142 is in communication with a web-based active virtual file system generally designated by the reference numeral 150, and also referred to as a "WAVFS." This active virtual file system 150 contains a network server operating system, which includes a powerful microprocessor circuit and physical storage devices at 152, including random access memory and at least one hard disk drive. The preferred active virtual file system 150 also contains a database at 154, which will be discussed in greater detail hereinbelow.

The preferred server operating system at this time is WINDOWS NT, and the preferred database system at this time is ORACLE, however, it will be understood that virtually any type of computer operating system or database program could be used with the active virtual file system of the present invention. It will be further understood that the terminology "web-based" in reference to the file system of the present invention means that each user will preferably have a web browser on his or her computer platform, although each such user may or may not be communicating to the WAVFS platform over the Internet. In other words, users talking to the WAVFS platform 150 over a LAN (e.g., users 124 and 126 on FIG. 2) are not using the Internet, but they nevertheless are using a web browser to better utilize the features of the WAVFS.

As in conventional network servers, virtually the first thing that must occur when a user initially communicates to a distributed file system is to determine whether or not that user has any right to be logged into the file system. In the present invention, the active virtual file system 150 utilizes an "Authentication" function 160 to determine if this particular user now communicating to the WAVFS 150 should gain access at all to the system. More detailed information concerning this function will be presented below.

Once the user has been properly authenticated, this user's access rights must now be determined, and the WAVFS 150 uses an "Access Rights" function 162 for this purpose. The user's access rights are represented by information that has been stored in the WAVFS 150 pertaining to this particular user. This information essentially determines whether or not a user has the right to either read or write, or both read and write, a particular file that already resides on the active virtual file system's hard disk drive at 152. These access rights also determine whether or not a user will be able to upload a new file onto the hard disk drive at 152. More detailed information concerning this function will be presented below.

Other functions that are available to the active virtual file system 150 include a "User Management" function at 164, and a "Group Management" function at 166. In short, these functions allow the systems administrator to add, delete, or edit users and their attributes (at the User Management function 164), and to also group various users in predetermined ways using the Group Management function 166. Further information concerning these functions will be presented below. These User Management and Group Management functions of the present invention also allow importing users/groups from other systems, such as UNIX password/group files, or from other systems such as NIS, NT or Novell operating systems. This functionality is extremely useful to users that already own a database of information (e.g., a listing of employees with standard personnel information), since this database can be imported into the WAVFS 150 to automatically create new users and groups in one major step. By use of this importation capability, the customer (i.e., the systems administrator) will not need to enter by hand all of these employee records into the FileDelivery™ system when creating entries for these new users and groups.

In the preferred active virtual file system 150, the main kernel logic operates at a level only as low as "folders," or directories in the vernacular of a disk operating system. Individual files and application programs are controlled at a different level by a different functional application. In the preferred file system, a "Modules" function at 170 contains logic that controls the appearance of the screens at the user's monitor. Furthermore, command choices at the user's monitor screen are provided at the appropriate times. This Modules function 170 manages the files of a folder—and therefore, can control individual files—and also contain applications (such as word processors and spreadsheet computer programs). Another example of an application controlled by the Modules function 170 is a personal address book application, or a calendar application.

The Modules function block 170 also controls "objects," which are depicted as a separate function block at 172. A file is an example of an object, and an event is another example of an object. An application program can also be an object. More detailed information concerning the Modules function 170 and Objects function 172 will be discussed in greater detail below.

Another unique function associated with the active virtual file system 150 is an "Automatic Notification" function block at 180. This Auto-notification function 180 is what makes the present invention an "active" file system. The Automatic Notification function 180 checks to see if any "triggering" events have occurred when a user performs a particular task. Such a triggering event could be merely the opening of a file on the hard disk drive 152. A more useful Automatic Notification function perhaps is when a user modifies a file and saves it on the hard disk drive 152. This is referred to as "uploading" a file from a user into the WAVFS 150. When a user "opens" a file from the hard disk drive 152, this is referred to as "downloading" a file from the WAVFS 150.

The Automatic Notification function 180 defines what exact type of event will become a triggering event. Furthermore, the Automatic Notification function 180 also defines what will be the triggering action, once the triggering event occurs. All of this information preferably is stored in the database 154. In the preferred embodiment, the database software (which preferably is ORACLE) will hold all of the defining triggering events and triggering actions in a single large table of the database. Of course, it will be understood that other brands of database management software could be used instead of ORACLE for this task, or a special file structure could be created that uses no commercially-available database software.

The fact that the file system 150 of the present invention is an active file system is a significant distinction as compared to conventional file systems known in the prior art. While there have been active databases known in the prior art, the predefined events and actions of such active databases are merely contained within the database itself, and none of the active functionality is at all related to the computer's central file system. The active aspects of the present invention, to the contrary, work completely outside any database program and instead concentrate on the file system itself to both control certain actions by users, and then provide an Automatic Notification function upon the occurrence of other predetermined actions by these users. For example, if a user is logged into the WAVFS 150 and downloads a particular file, edits that file, and then saves that file into the hard disk drive 152 by uploading the file into the WAVFS 150, then the present invention's Automatic Notification function has the capability to send messages automatically to other users that have an interest in this particular file. This notification would normally be sent to users who are grouped, according to the Group Management function 166. In the preferred embodiment, these Automatic Notification messages are transmitted via E-mail technology. A more complete description of the Automatic Notification functions for the active virtual file system 150 is provided hereinbelow.

As noted hereinabove, "complex" triggering events certainly may be more complex than simple file operations, and such complex triggering events are completely programmable. Moreover, their resulting actions also are completely programmable, and these actions may be similarly "complex," having the capability to launch completely separate application programs. As stated above, the "complex actions" that can be programmed using the WAVFS 150 may launch application programs to both LAN users, such as users 124 and 126 (without use of the Internet) and to WAN users (including those connected via the Internet, such as users 120 and 122). To implement these programmable actions, a graphic user interface, or a scripting language (or both) optionally can be provided for use by the systems administrator.

It will be understood that the WAVFS operating system may operate as a stand-alone system, or may be resident (e.g., as a library) on top of other architectures, or applications running on the same computing platform. In this sense, the FileDelivery™ system of the present invention is a "technology" rather than a single product. For example, FileDelivery's API (Abstract Program Interface) functions at both the "front end" and at the "back end." The front end API acts as the user interface and makes the system extensible such that other applications may be integrated with the FileDelivery™ technology. The back end API enables the FileDelivery™ technology to be implemented on top of different architectures. For example, to implement the FileDelivery™ technology of the present invention on top of an ORACLE database program, the bottom layer only need by implemented using ORACLE.

Figure 3:
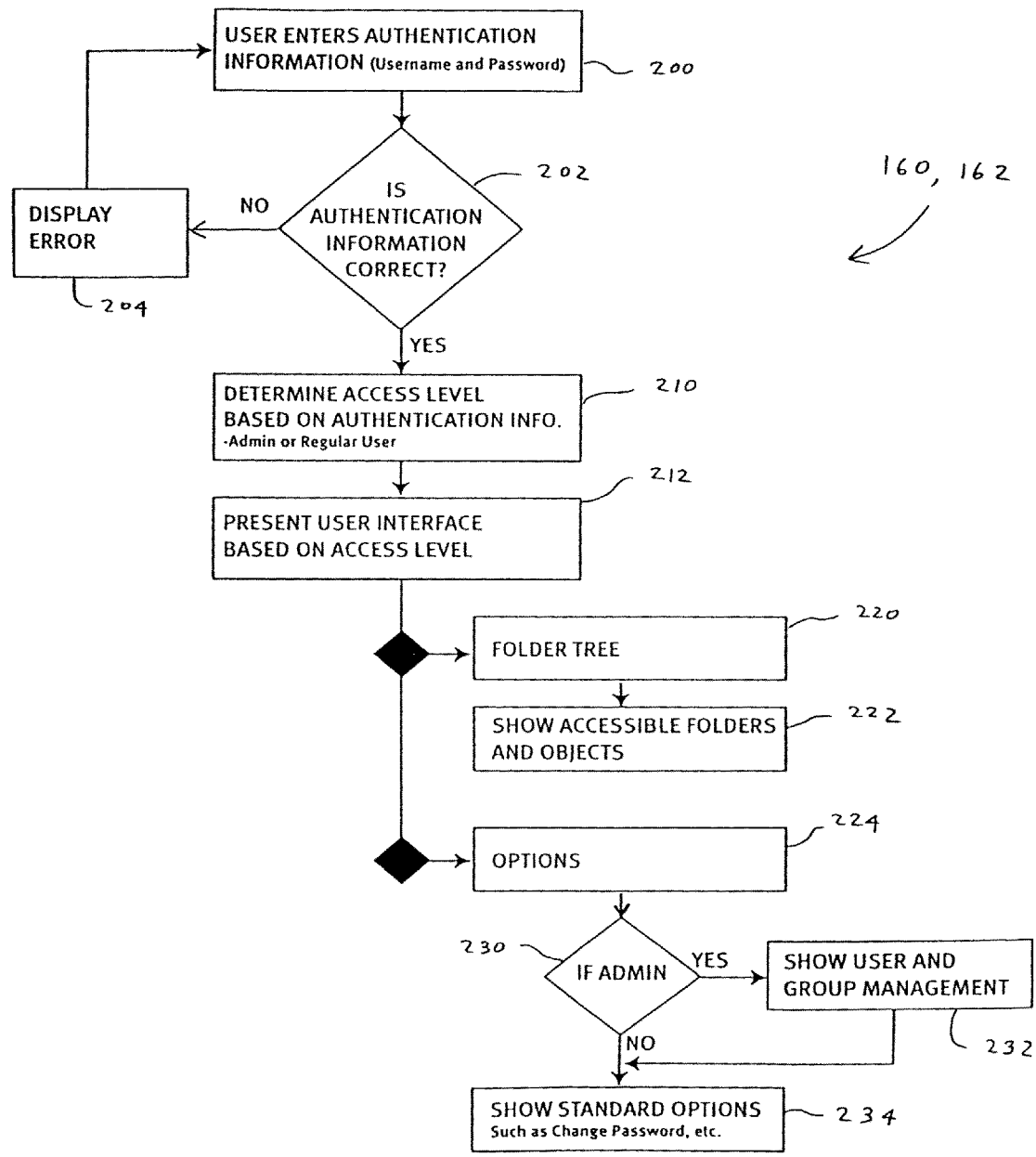
FIG. 3 is a flow chart showing the logical operations for authentication and controlling user's access rights of the web-based active virtual file system of FIG. 2.

On FIG. 3, the logical functions and certain choices presented to the user are depicted in a flow chart format for the Authentication function 160 and Access Rights function 162. The Authentication function provides a mechanism that allows a user to access a FileDelivery™ server, which is another name for the preferred server 152 of the web-based active virtual file system 150. The default authentication method uses an internal user database that is based on user components, such as the "username" and "password." This is the information that is presented to the step 200 on FIG. 3, in which the user enters his or her authentication information. A decision step 202 determines whether or not the authentication information is correct, and if not, an error message is displayed at a step 204.

Additional security preferably is provided using an SSL (Secure Sockets Layer) on the FileDelivery™ server. The Authentication procedure provides a single access point to all objects and folders residing on the active virtual file system 150, and the "Access Rights" function. Users can optionally encrypt their data by use of, for example, PGP encryption software. The operation of uploading files to the FileDelivery™ server 152 of the present invention can be enhanced by, first, seamlessly encrypting the contents of the user's file (or other type of data structure), such that the encryption operation is transparent to the user, and second, automatically uploading the (encrypted) file into the server 152.

If the authentication information was correct at decision step 202, then a step 210 determines the access level for this user based upon the authentication information. At this point, it is determined if the user-entered authentication information reveals that a regular user has logged into the system, or if the systems administrator has logged into the system. This information will be used later.

A step 212 now presents user interface information based upon his or her access level. A display screen is sent to the monitor of the user at his or her remote location, and this display screen will present a folder tree (e.g., a Java folder tree) and a set of options. An example of such a display screen for a systems administrator is provided on FIG. 4.

Referring back to FIG. 3, the function step 212 will simultaneously display a folder tree at a step 220 and a list of options at a step 224. The folder tree choice will include accessible folders and objects at a step 222. The options choice at 224 first looks to see if the person logged into the system is the administrator or not, at a decision step 230. If the answer is YES, a step 232 will show user and Group Management information on the administrator's display screen. If the answer was NO at decision step 230, then a step 234 will show standard options, such as changing a password. The systems administrator also has access to these standard options at step 234.

Figure 4:
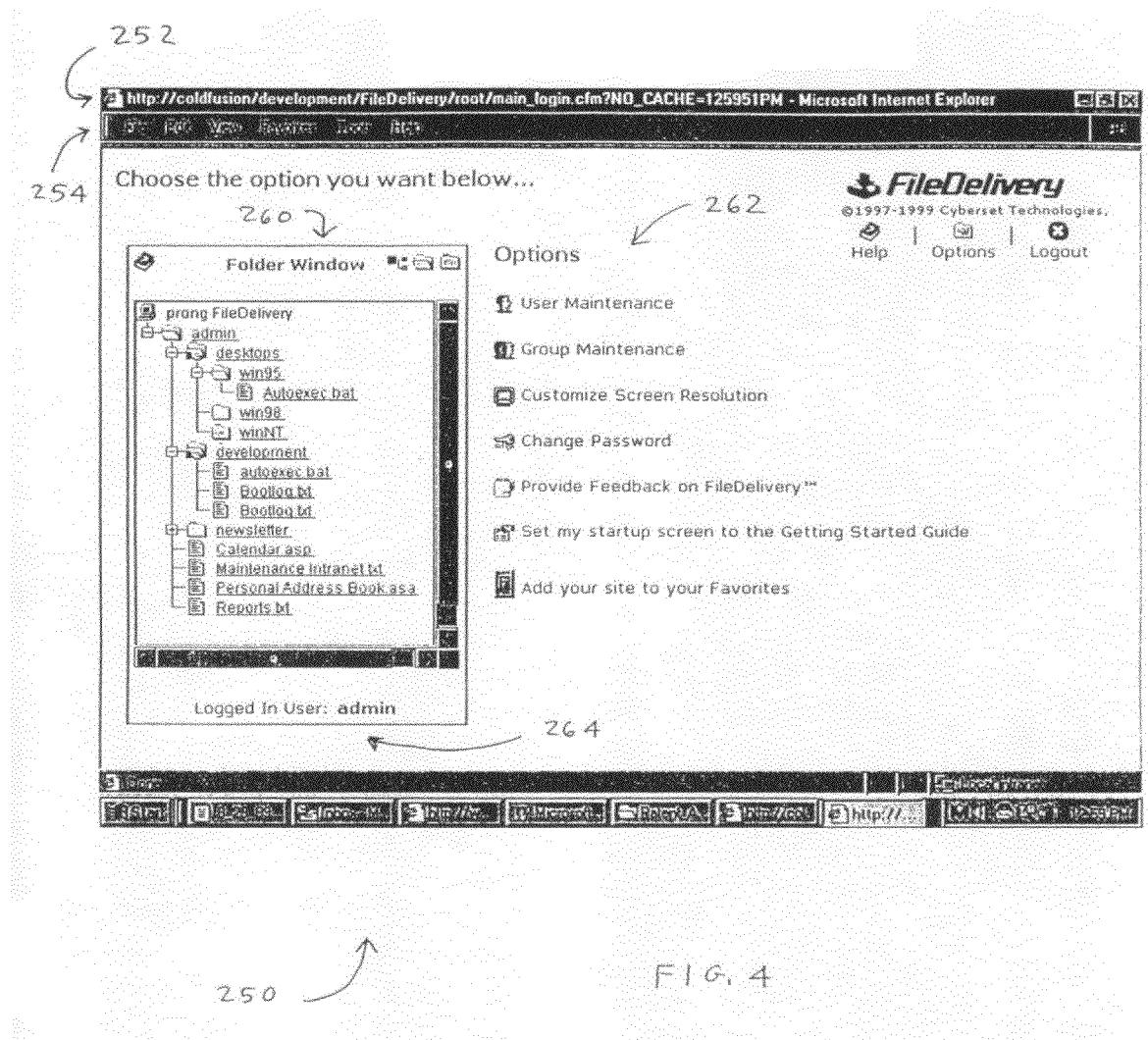
FIG. 4 illustrates a display screen depicting some of the options available to a systems administrator of the web-based active virtual file system of FIG. 2.

Referring now to FIG. 4, a display screen 250 shows both a folder window at 260, and a list of options at 262. In this example screen 250, the user who has been logged into the FileDelivery™ server is the systems administrator, as can be seen by the notation at 264.

Display screen 250 includes the standard Internet header information at 252, and also displays a top menu bar at 254. The folder window 260 presents a tree structure of folders, which is the function at step 220 on the flow chart of FIG. 3. The information in the folder window can go all the way down to the file level, such as the file named "Autoexec.bat." Folder window 260 can also display application programs, such as a calendar program, or a newsletter program. These files and applications are also referred to herein as "objects."

The options that are listed at 262 include the standard options for performing various administrator functions on a FileDelivery™ server constructed according to the present invention. This includes user maintenance, group maintenance, customizing the screen resolution, changing passwords, providing feedback on the FileDeliver™ system, setting the user's startup screen to the "Getting Started Guide," and adding a site to the "Favorites."

If, for example, the "User Maintenance" option is selected at 262, then a display screen such as that depicted in FIG. 5 comes up on the systems administrator's monitor. On FIG. 5, the left-hand column at 270 lists the names of the users in a particular format, typically referred to as the "username," and the next column to the right at 272 displays a particular symbol or flag if any particular user is authorized to view particular files. The next column to the right at 274 shows a particular symbol or flag if a particular user can be edited by the systems administrator, and the far right-hand column at 276 displays a particular flag or symbol if a particular user can be deleted, or has been deleted from the system in this session.

Figure 9:
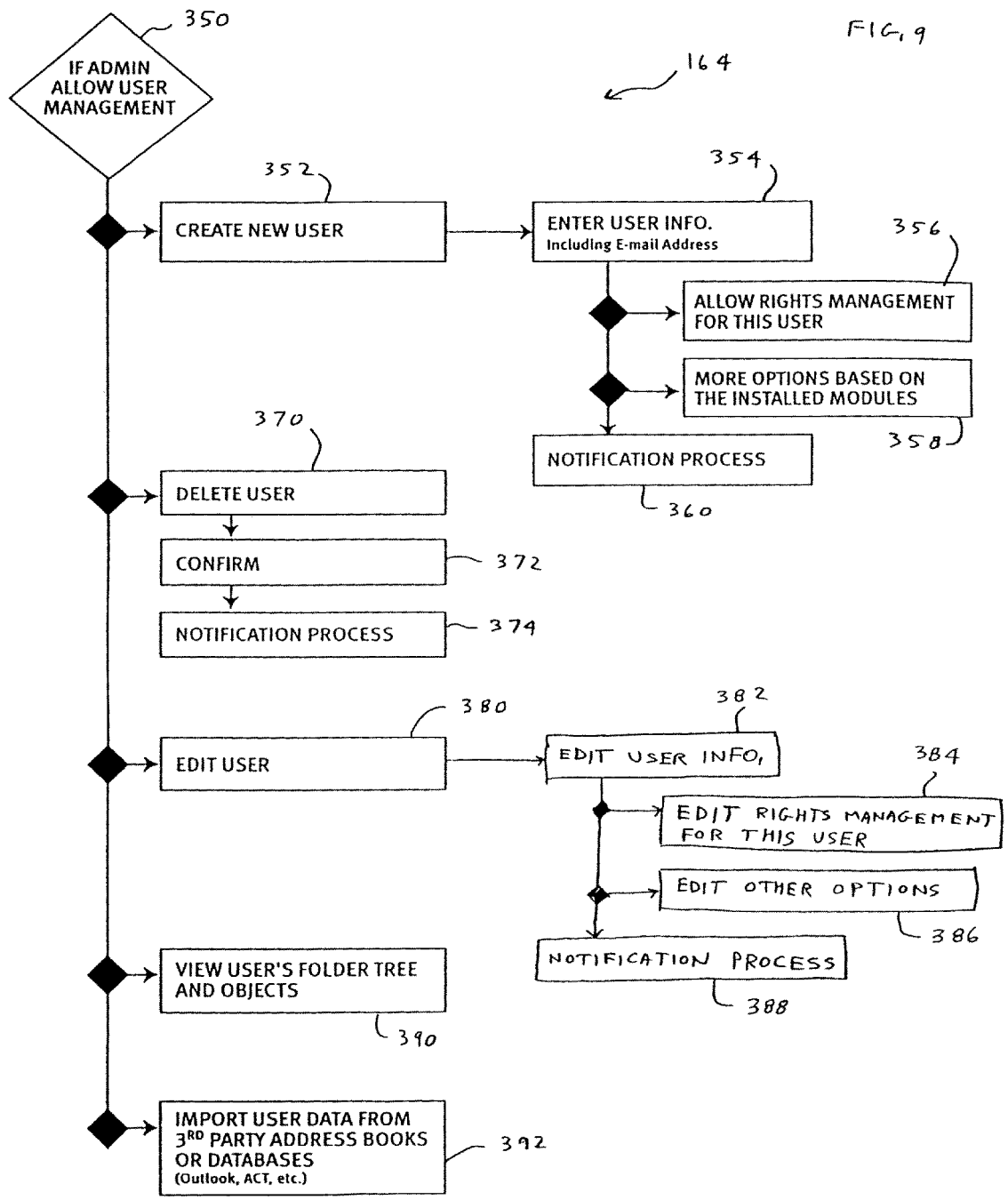
FIG. 9 is a flow chart showing some of the choices presented to a systems administrator performing User Management functions of the web-based active virtual file system of FIG. 2.

In addition to the main rows and columns of the screen depicted on FIG. 5, the systems administrator also has two "buttons" that can be selected, including a "Create New User" button at 277, and a "Back to Startup Screen" button at 278. The logic describing these steps to create a new user is depicted in FIG. 9, which is described in greater detail, hereinbelow. If the choice is made to go back to the startup screen, then the logic flow is directed back to step 212 on FIG. 3. The attributes of a user in the preferred FileDelivery™ system will be discussed hereinbelow.

Figure 6:
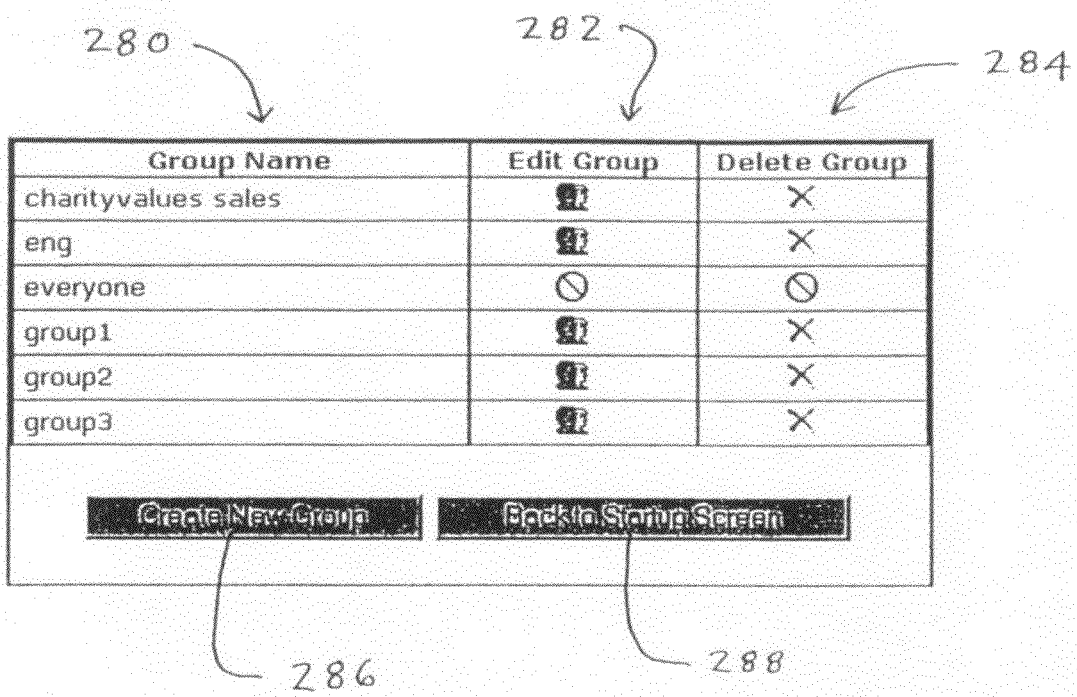
FIG. 6 illustrates a computer display screen depicting some of the functions for Group Management available to a systems administrator using the web-based active virtual file system of FIG. 2.

If the option called "Group Maintenance" is selected at column 262 on FIG. 4, then the next display that will be presented on the systems administrator's monitor will have the appearance of that depicted on FIG. 6. On FIG. 6, the left-hand column at 280 lists the names of various "groups" that reside within the FileDelivery™ system. The attributes of a "group" will be described in more detail hereinbelow.

The center column of FIG. 6 at 282 provides a symbol or flag that illustrates what groups can be edited, or are currently undergoing an edit procedure. The far right-hand column at 284 provides a symbol or flag that determines whether or not the systems administrator can delete a group, or already has deleted a group in this session.

If the systems administrator desires to create a new group, then the soft button at 286 titled "Create New Group" will be selected. If that occurs, then the logic flow is directed to that described on FIG. 10, which is described in greater detail, hereinbelow. On the other hand, the soft button at 288 will take the systems administrator "Back to Startup Screen," which will cause the logic to be directed back to step 212 on FIG. 3.

FIG. 7 illustrates the options that are typically made available to a user who is not a systems administrator. The options listed at 290 on FIG. 7 would replace the options depicted on FIG. 4 at 262, which are available only to a systems administrator. As can be seen on FIG. 7, some of these options relate to customizing the user's screen resolution, changing the user's password, providing feedback on the FileDelivery™ system, setting the startup screen to the "Options Screen," taking the user back to the "Getting Started Guide," or adding a site to the user's "Favorites." If the user is a systems administrator, then both sets of options 262 and 290 would be listed on the display.

When using the active virtual file system of the present invention, it is preferred that a virtual folder system be used to provide the core functionality on the preferred FileDelivery™ server at 150. The user interface depicted on FIG. 4 at 260 preferably is based on a hierarchical "tree" structure that organizes sub-folders and objects. This structure preferably is not physical in nature, such as what a conventional file operating system would provide, and further the structure does not exist on a physical storage device, such as a hard disk drive. Instead, the preferred structure exists purely in a single table in a FileDelivery™ database (i.e., database 154 on FIG. 2). The methodology of the user interface of the present invention recursively accesses the database 154 to populate the tree that is displayed in the folder window at 260. In this manner, the preferred FileDelivery™ user interface provides a familiar way to visualize the virtual structure so as to access sub-folders and objects. In a preferred embodiment, the user interface is fully customizable.

Figure 8:
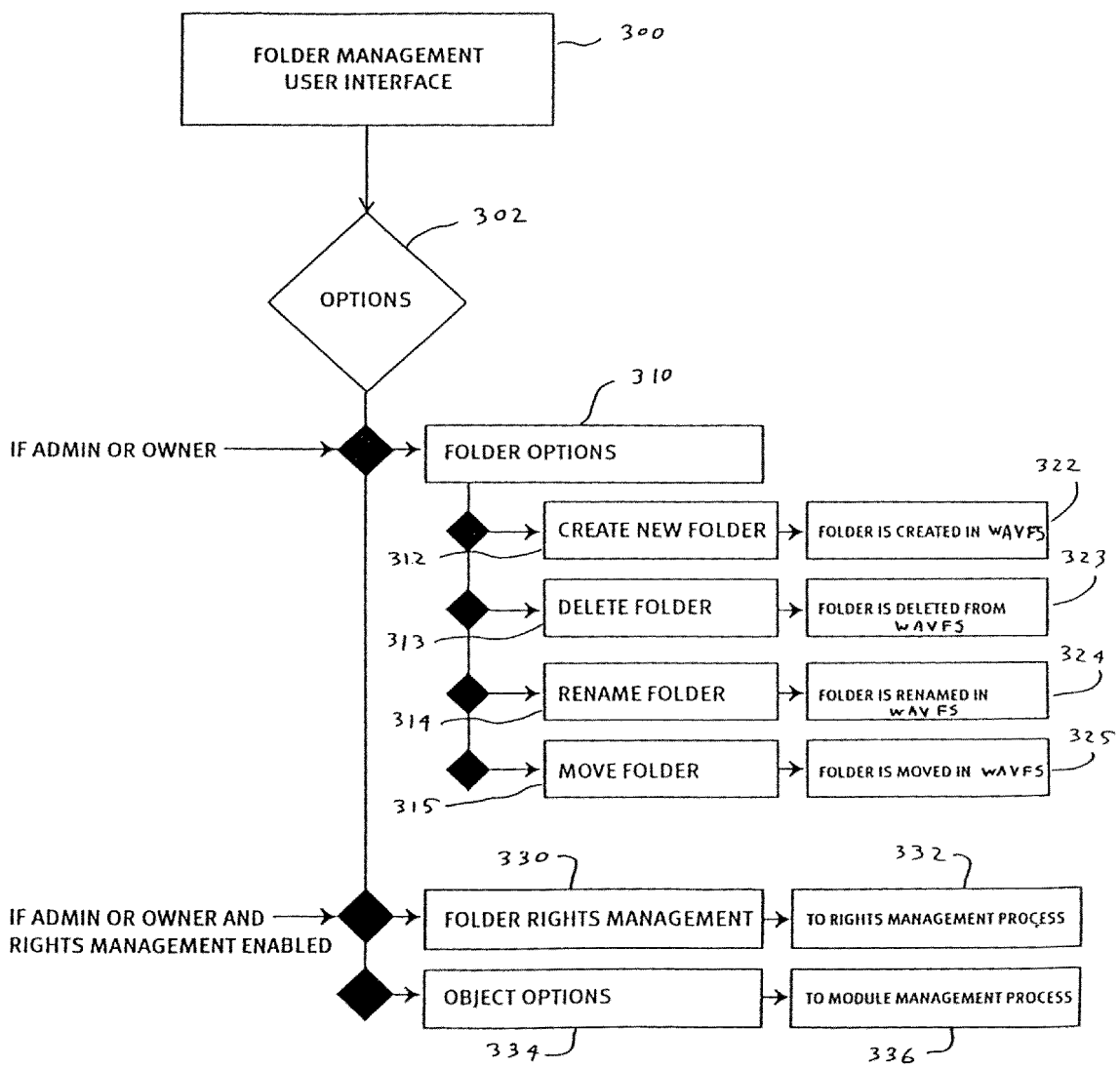
FIG. 8 is a flow chart depicting some of the choices presented to a user or systems administrator in managing folders, using the web-based active virtual file system of FIG. 2.

FIG. 8 illustrates a flow chart of the choices that can be made by a user to manage the folder of that particular user as the "owner" of that folder, or these choices are made available and can be managed by the systems administrator. Starting at a step 300, the user interface allows the owner or administrator access to his or her folders from the "Folder Window" 260 on FIG. 4. The user can "click" on one of the folders within the folder window 260, and a set of options will be displayed on the user's monitor, as depicted at a step 302 on FIG. 8. On FIG. 8, the logic flow at certain nodes has the meaning of providing to the user more than one choice that is simultaneously displayed on the user's monitor screen. For example, when leaving the decision step 302, a step 310 provides folder options to the systems administrator or to the owner of this folder, while at the same time a step 330 provides "Folder Rights Management" to the administrator or owner if the rights management function has been enabled. Moreover, a step 334 also will simultaneously present "Object Options" to the administrator or owner if the rights management function has been enabled.

Assuming the administrator or owner has selected the "Folder Options" at 310, then four new choices are simultaneously presented on the monitor screen, including a "Create New Folder" function at a step 312, a "Delete Folder" function at a step 313, a "Rename Folder" at a step 314, and a "Move Folder" at a step 315. If the administrator or owner selects any one of these four options (which would typically be made available on a pull-down menu), then that task will be executed by the preferred FileDelivery™ system. For example, if the Create New Folder function is selected at 312, then at a step 322 a new folder will be created in the active virtual file system 150, wherein the user can select the name of this new folder. If a pre-selected folder is to be deleted, as per step 313, then a step 323 will delete that folder from the active virtual file system 150. Similarly, if a pre-selected folder is to be renamed as per step 314, then a step 324 will rename that folder in the active virtual file system 150, wherein the user selects the new name. Finally, if the Move Folder function is selected at 315, then a step 325 will move a pre-selected folder within the active virtual file system 150 to a location that is named by the user.

Figure 11:
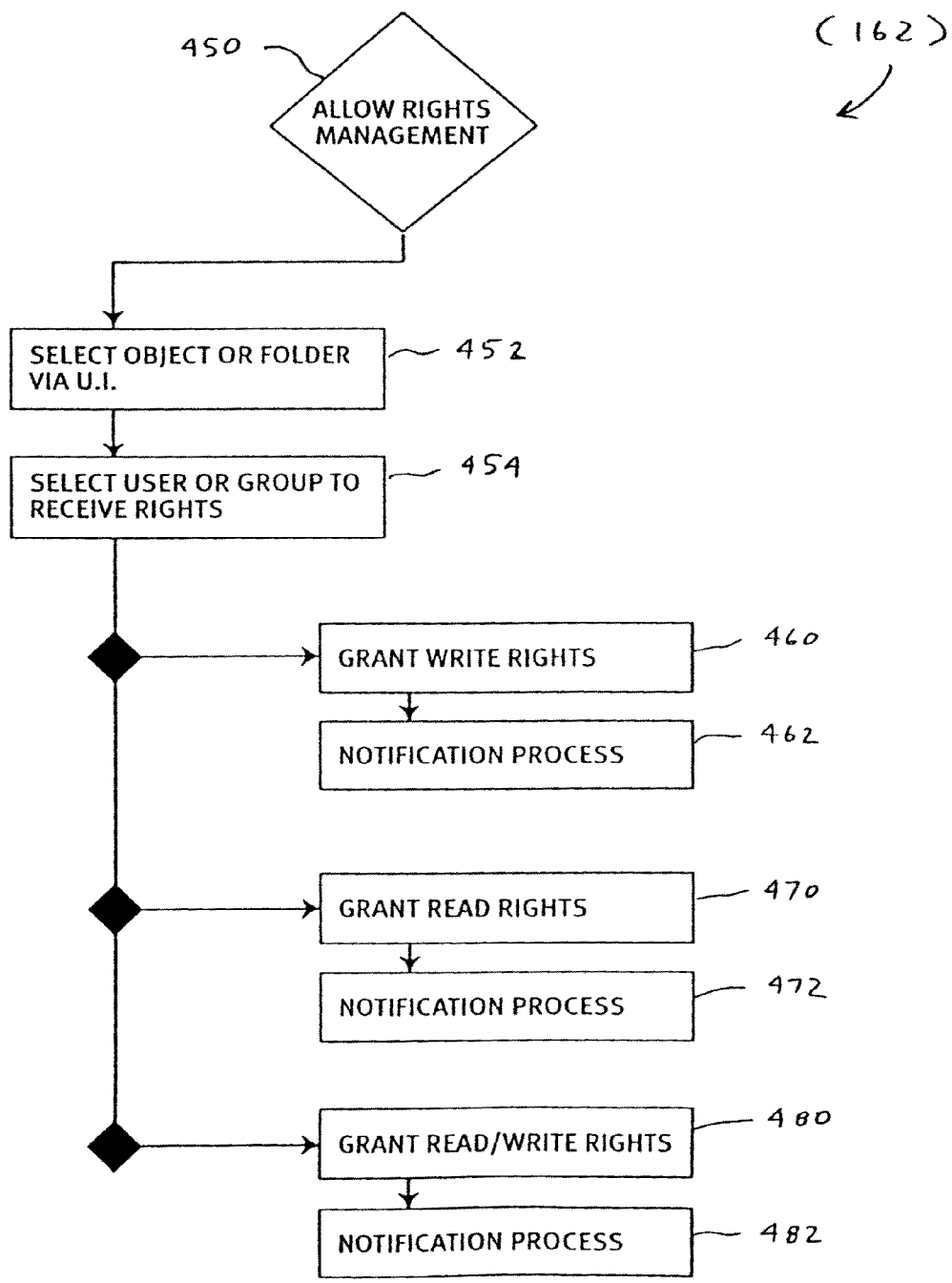
FIG. 11 is a flow chart depicting some of the logical operations and choices presented to a systems administrator performing Access Rights management functions with respect to users and groups, using the web-based active virtual file system of FIG. 2.

If the administrator or owner instead selects the "Folder Rights Management" function at 330, then a step 332 will be executed that directs the logic flow to the flow chart depicted on FIG. 11. This will be discussed in greater detail hereinbelow.

Figure 13:
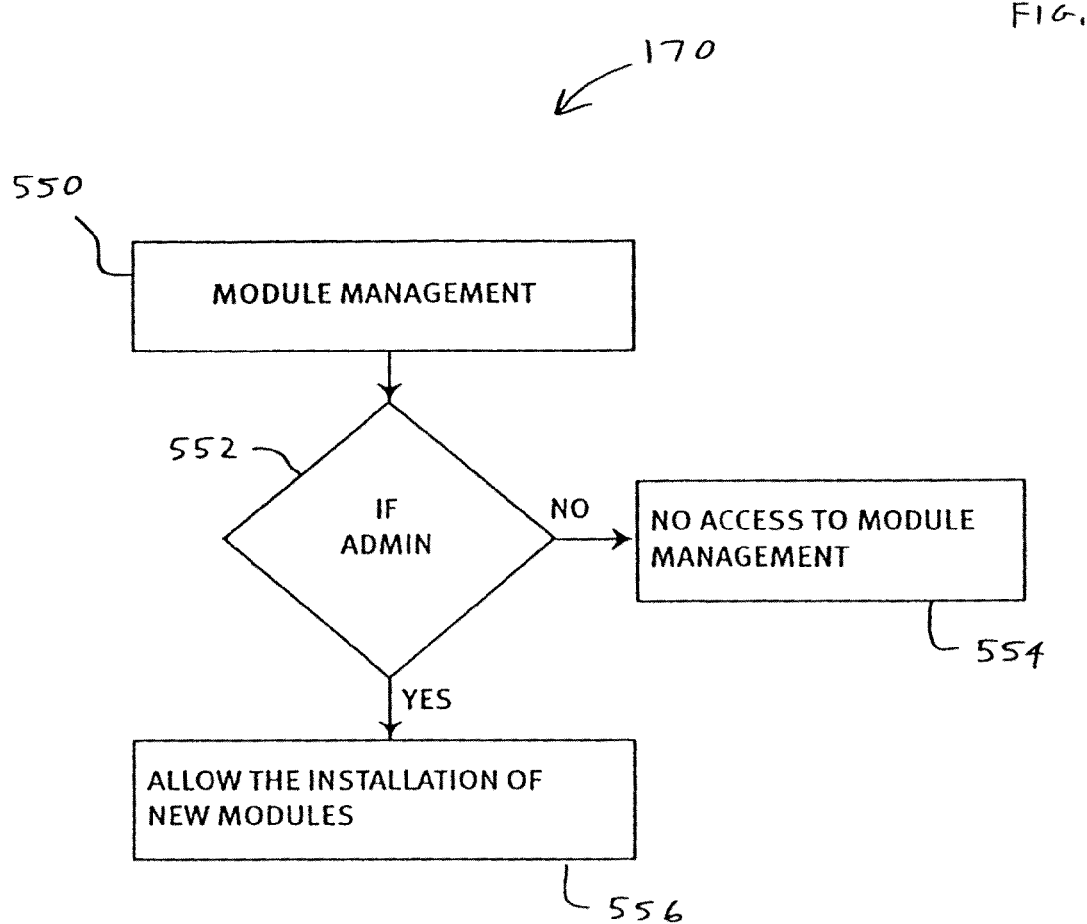
FIG. 13 is a flow chart showing some of the logical operations involved with the management of modules, using the web-based active virtual file system of FIG. 2.

Finally, if the administrator or owner selects the "Object Options" function at step 334, then a step 336 will direct the logic flow to the Module Management process, which is depicted on FIG. 13. This function will also be discussed in greater detail hereinbelow.

The User Management function 164 on FIG. 2 can only be utilized by the systems administrator. FIG. 9 illustrates a flow chart depicting the types of choices that are made available to the systems administrator who enters this User Management routine, starting at a decision step 350. Once into the User Management routine, several choices will simultaneously be presented to the systems administrator on his or her monitor screen. These choices include a "Create New User" function at a step 352, a "Delete User" function at a step 370, an "Edit User" function at a step 380, a function that allows the systems administrator to view the user's folder tree and the user's objects that a user has access to, based on the user's rights management, at a step 390, and finally a function at a step 392 that allows the systems administrator to import user data from a third party address book or database. An example of the source for this information could be an entry in a Microsoft Outlook module.

A user is a person who can be authenticated to the preferred FileDelivery™ server 152 of the active virtual file system 150. Users are provided with certain rights by the systems administrator of the FileDelivery™ site, as controlled by the Access Rights component or function. The properties of a user include his or her E-mail address, password, and demographics and other specific information.

There are two main types of users: the first type is the "Admin User" and the second type is the "Regular User." The Admin User (also referred to herein as the "systems administrator") is empowered to configure and maintain the FileDelivery™ site, and is empowered to administer users, groups, rights, and modules. A Regular User is empowered to manage his or her own personal folders and objects, and also any shared folders and objects that he or she may have rights to.

Referring back to FIG. 9, if a new user is being created at step 352, then a step 354 requests certain information that is to be entered by the systems administrator about this particular user. The user's E-mail address is one critical piece of information that must be included at this point. At this time, other choices are presented to the systems administrator, including a step 356 which provides that the systems administrator can allow certain rights management for this particular user. In addition, a step 358 allows further options based upon modules that have been installed in the active virtual file system 150.

Once the user information has been entirely entered by the systems administrator, a step 360 provides a notification to predetermined users of the active virtual file system 150, preferably by use of an E-mail message sent to those other users. This notification process is automatic, as per the Auto-notification function 180 of the active virtual file system 150. This is a primary example of the "active" file system of the present invention, versus a passive file system known in the prior art. Not every user in the active virtual file system 150 will necessarily receive a notification of an E-mail message, but instead only predetermined users will receive this message, as selected in advance by the systems administrator. One common method of selecting the particular users who will receive this notification message will be to form "groups" and to provide each user in a particular group with this notification message, but not provide any other users in the active virtual file system 150 with this particular message.

By use of E-mail-type messages, the notification process can be initiated simultaneously for all users who are to receive any such notification message. At the same time, the actual delivery of these messages can be performed more or less at the discretion of the file system itself, such that these messages will not interfere with other important active processing. Instead, these messages will be delivered in due course to the individual users, and if a user happens to be logged into the active virtual file system 150 in real time as the notification message is initiated, then that particular user will soon receive a message on his or her monitor screen that a new E-mail message has been received. The user can then review that message at his or her leisure.

If the administrator had chosen to delete a user at step 370, then a confirmation message is generated back to the systems administrator at a step 372, essentially requiring the administrator to verify that this is the correct user that is to be deleted. Assuming the confirmation is correctly acknowledged, then a step 374 will notify predetermined users of the deletion of this particular user. Again, this notification message preferably will be delivered using E-mail messages, and the recipients of such message will be predetermined based upon either groups of users, or other criteria selected by the systems administrator in advance.

As an alternative to E-mail technology, the Automatic Notification function 180 can be implemented by a rules-based system that could, for example, automatically execute other computer programs upon the occurrence of the triggering event, or implemented by use of the triggering features of an active database computer program, such as ORACLE or DB2. Using these rules-based features of the present invention, further operations can be programmed to automatically perform tasks other than simple E-mail messages. For example, if a particular user is an employee who has resigned from a company, then his or her files could automatically be archived by a FileDelivery™ command (launched by an Automatic Notification function) at the same time that his or her user status is been deleted by the administrator. In another example, a student who is graduating from a university should be deleted from many records (such as E-mail access rights). The FileDelivery™ system of the present invention could automatically delete certain files or records as the student's status is changed by the administrator to "graduated."

If the administrator wants to edit a user's attributes or other information, then step 380 will be followed by a step 382 where the user's information can be edited, including the user's E-mail address. Once this step 382 has been executed, then other choices are made available to the administrator, including editing the Rights Management for this user at a step 384, and editing other options on modules that have been installed in the active virtual file system 150, at a step 386. Finally, once this editing procedure has been finished, a notification process is initiated at a step 388, in which preferably an E-mail message is sent to the appropriate users, who are pre-selected by the systems administrator, and would likely be members of the same group as the user who is being edited.

Figure 10:
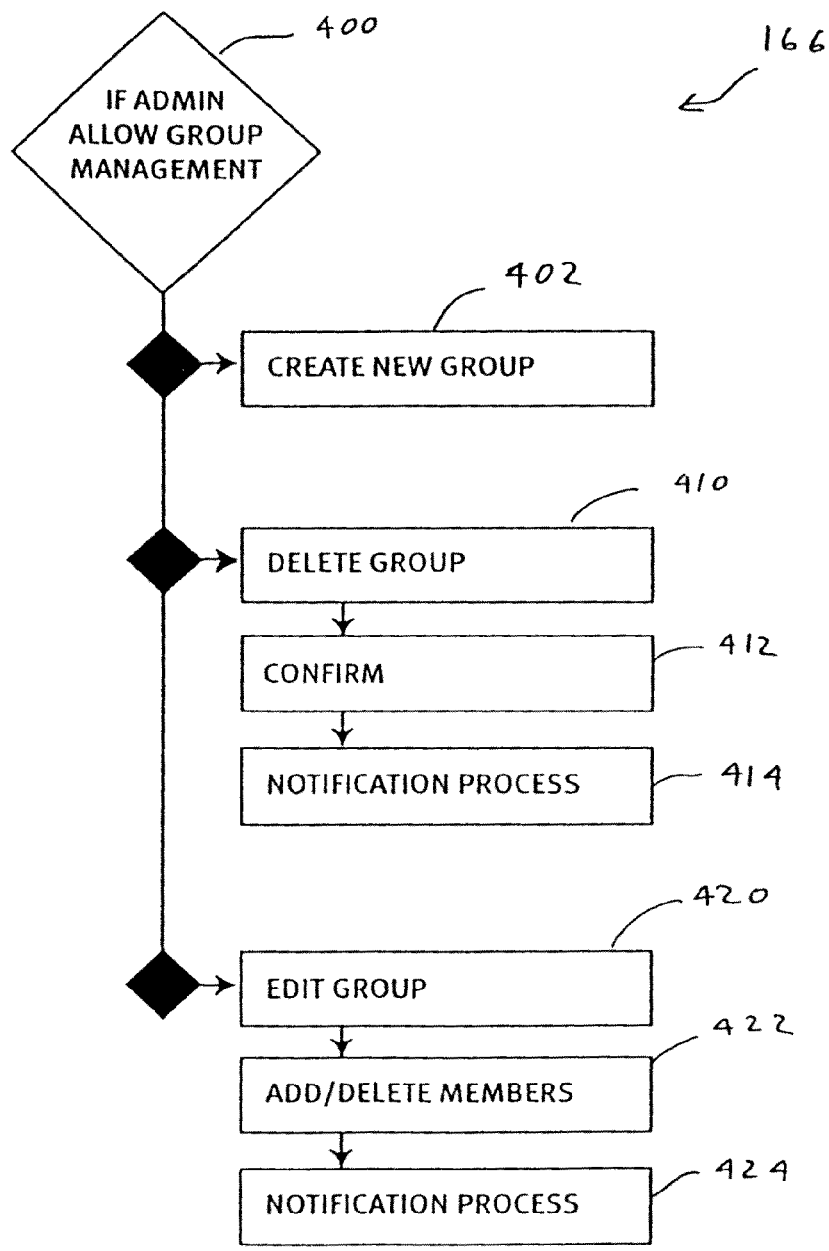
FIG. 10 is a flow chart depicting some of the important choices made available to a systems administrator performing Group Management functions, using the web-based active virtual file system of FIG. 2.

When the systems administrator utilizes the Group Management Function 166, certain choices will be presented to the administrator, as illustrated in the flow chart on FIG. 10. Beginning at a step 400, several choices will simultaneously be presented to the administrator on the administrator's monitor screen. These choices include creating a new group at a step 402, deleting a group at a step 410, and editing a group at a step 420.

A group is defined as a collection of users, and groups are created and maintained by the systems administrator. Rights are assigned to groups by the administrator, and such rights are governed by the Access Rights component or function at step 162 on FIG. 2. The essential properties of a group are (1) a description or name of that group, and (2) group members, which means particular users that are authorized to be using the active virtual file system 150.

When a group is first created at step 402, the systems administrator merely lists the particular set of users that are members of this group. No notification procedure is necessary at this time, although one could potentially decide to notify the first member of a group that has been newly created that a second member has been added to that group. However, it is preferred that, in this initial creation of the group, all user members be added in one logical operation and no notification is necessarily desirable at this point. Of course, the final step after listing all of the new members of a group newly being created at step 402 could be to send a notification message to each of those members that the group has indeed been created.

If the administrator desires to delete a group at step 410, then a confirmation message is sent by a function at a step 412 to confirm the validity of the administrator's initial command to delete a particular group. Assuming this confirmation is properly validated, then a notification process is initiated at a step 414 to send messages to all of the users of the group that is being deleted that the group has indeed been deleted.

If a group is to be edited in any way at step 420, then a step 422 allows the systems administrator to add or delete members from a particular group. Once this has been accomplished, a notification process is initiated at a step 424 which sends a message to all existing members of the group that one or more particular new members have been added, or that particular previous members have been deleted.

FIG. 11 is a flow chart showing some of the important logic concerning the rights of users in the active virtual file system 150 of the present invention. This flow chart relates to the Access Rights function 162 on FIG. 2, and begins with a decision step 450 that is entered to allow "Rights Management." This step 450 can only be passed through by either the systems administrator or the owner of a selected object or folder if Rights Management was previously enabled. This Access Rights function 162 provides a level of security for folders and objects. If a user is not the owner of an object, based upon that user's particular rights, he or she is only presented with objects that he or she is allowed to have access to. These access rights are administered to selected users by the systems administrator. Furthermore, users may also administer Access Rights if the "Rights Management" attribute is enabled for that particular user.

There are three different levels of access rights: (1) read, (2) write, and (3) read/write. The "read" access right provides the ability for a user or a group to view particular folders and objects. If a user or group has this right only, that user or group would not be able to create new folders and objects.

The "write" access right provides the ability for a user or group to create new folders or objects. With exclusively this right, the user or group would not be able to view folders and objects. The "read/write" access right provides the ability for a user or group to create folders or objects and then to view those folders and objects. This provides the user or group with full control over a folder or object.

An example of how these different access rights could be utilized in a teaching situation is as follows: if a teacher in an English class wishes to distribute a homework assignment to all of the students, the teacher creates a folder and assigns the "read-only" right to all of the students for that folder. The teacher then places the homework assignment in that folder, and all students now have "read-only" access to this homework assignment. These students can download and view this object, but they cannot modify or delete it.

If the teacher wants the students to turn in their homework assignments electronically, the teacher can assign a write-only right to that folder for all of the students. When a student uploads the homework assignment to this write-only folder, after the file has been uploaded the student would not be able to view the file because he or she does not have the "read" right. The teacher would be the only user that would be able to view, edit, or delete this file. Any other student who has "write-only" access to the folder will also not be able to see any files in this folder.

Continuing the example, if the English class teacher wishes to create a shared resource so that students of the class can work on a group assignment, the teacher creates a folder and grants "read/write" rights to four students, for example. These four students can now upload files to the folder, download files from that folder, view files, and delete files. This allows for a shared resource that all members of the team may have access to for a collaboration on the project.

Referring back to FIG. 11, the logic flow is directed to a step 452 where the object or folder of interest can be viewed on the user interface (i.e., monitor screen), such as the Folder Window 260 on FIG. 4. Once the particular object or folder has been selected at step 452, a step 454 enables the owner or administrator to select a particular user or group to receive rights for accessing the selected object or folder. At this point, several options simultaneously appear on the screen of the owner or administrator.

One of the above-noted options is to grant "write" rights at a step 460. Another option is to grant "read" rights at a step 470. A third option is to grant "read/write" rights at a step 480. Once the particular rights have been granted at any of these steps 460, 470, or 480, an Automatic Notification procedure occurs, at a corresponding step 462, 472, or 482, respectively. This notification process preferably is sent by E-mail technology, as related hereinabove. It is preferred that this notification process be utilized to inform the particular user or group that was selected at step 454 of the new rights that have just now been granted.

It will be understood that certain conventional access control technologies are presently available that could also be used as an "access rights" function. For example, NT ACL's, POSIX ACL's, or Novell access control mechanisms have powerful functionality that could be utilized in conjunction with the active virtual file system 150 of the present invention.

Figure 12:
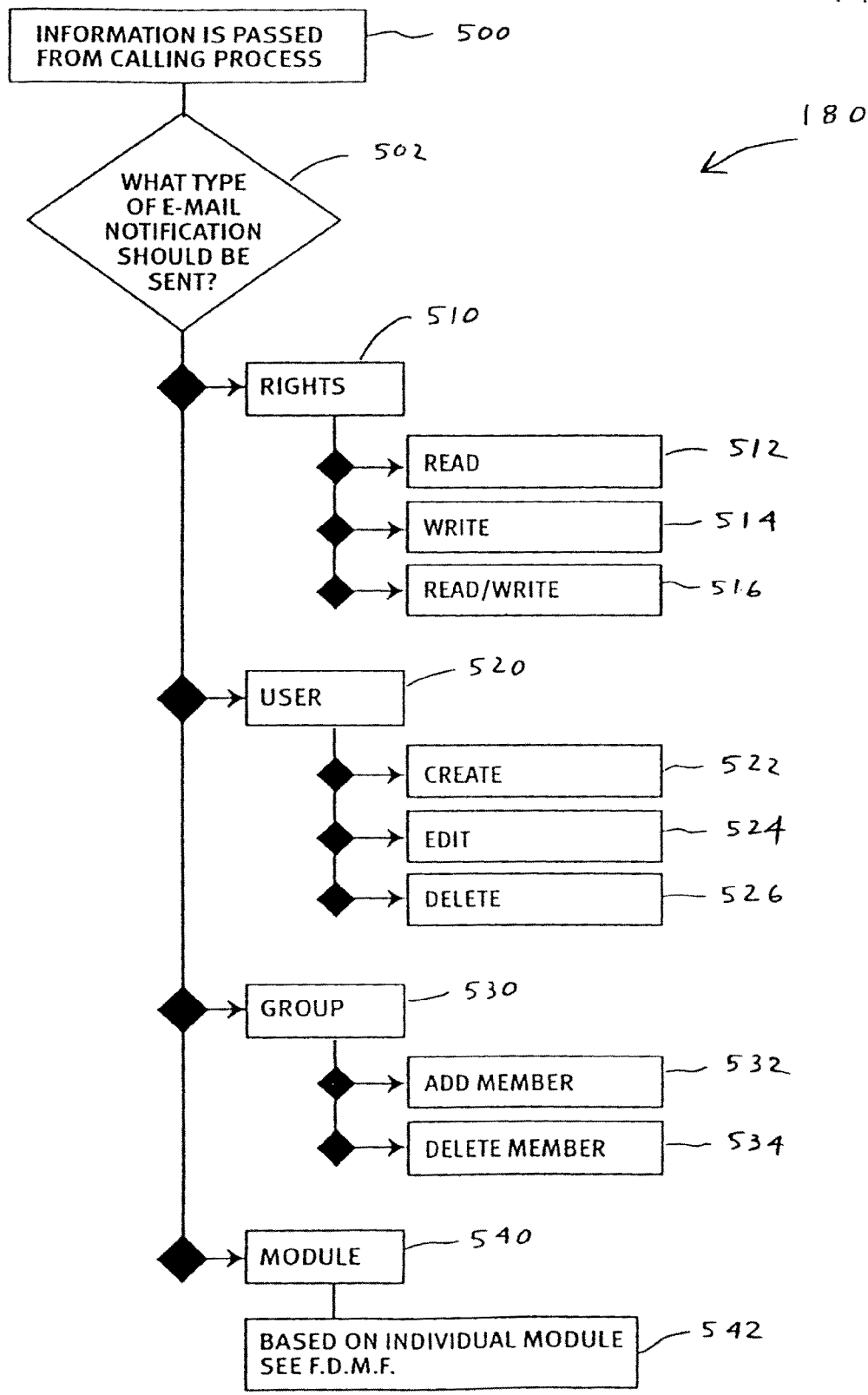
FIG. 12 is a flow chart depicting some of the important choices made available to a systems administrator when selecting the type of Automatic Notification functions for various user operations, using the web-based active virtual file system of FIG. 2.

FIG. 12 is a flow chart illustrating some of the functions of the Auto-notification component or function 180 on FIG. 2. Starting at a step 500, information is passed from a calling process, in which the process requests a notification message to be sent. A decision step 502 now determines what type of E-mail notification that should be sent. At this point, several options are made available for the systems administrator to manage. A list of these options includes a "Rights" option 510, a "User" option 520, a "Group" option 530, and a "Module" option at 540.

If the Rights path at 510 is chosen, then the choices are "Read" at 512, "Write" at 514, or "Read/Write" at 516. If the "User" choice at 520 was selected, then the further choices are "Create" at 522, "Edit" at 524, or "Delete" at 526. If the "Group" choice at 530 was selected, then the further choices are to add a member at 532, or to delete a member at 534. If the "Module" choice at 540 was selected, then the further action is based upon the individual type of module as it resides in the preferred FileDelivery™ system, as indicated at a step 542.

The Auto-notification messages can be E-mails that are triggered automatically by events that take place in the components of the active virtual file system 150. Instead of E-mails, however, the Auto-notification function can also comprise other programs that are launched to perform certain tasks. The precise type of auto-notification is fully configurable for each component in the preferred active virtual file system 150.

Certain functions preferably will occur when using the principles of the present invention concerning the active virtual file system 150. For example, users can automatically receive an E-mail message when specific events occur that pertain only to that user. On the other hand, group members (which include individual users) can automatically receive an E-mail message notifying those group members when specific events occur that pertain to their particular group.

All Auto-notification messages contain links to the preferred FileDelivery™ server 152, and the link will open the user's web browser (e.g., the browser at the first user 120 or the second user 122) and take the user directly to the folder or object that was just triggered. The users 124 and 126 connected to the LAN 145 would also have web browser software resident on their PC's/workstations, and the browser would be similarly opened by the link. As an example, when the systems administrator creates a new user, an Auto-notification E-mail message is generated to that particular user informing the user of the existence of the FileDelivery™ server 152, and describing some of its functionality and further how to "Login" to the FileDelivery™ server 152. As a second example, when a user uploads a file to a folder, all group members and users who have access to that folder preferably will receive an Auto-notification E-mail message informing them of how to gain access to that file.

As discussed above, the use of E-mail technology provides certain advantages, such as balancing the loading of the network traffic. This allows users to come to the file, rather than sending the file to all of the users. In the preferred mode of operation of an active virtual file system 150, a "Files" module is provided to combine World Wide Web technology and E-mail technology to allow users to seamlessly upload and download files to and from FileDelivery™ folders over the Internet. When a new file becomes available for a user to either download or view, the FileDelivery™ system provides an Automatic Notification message to the appropriate users via E-mail technology. Furthermore, an Auto-notification message is sent to predetermined users and/or the systems administrator when a user has uploaded a file onto the FileDelivery™ server 152. The administrator users of the FileDelivery™ site can generate reports that track the activity involving files, specifically including information as to which users edited, uploaded, or downloaded files.

One unique aspect of the preferred FileDelivery™ system of the present invention is the fact that more than one single file can be stored having the same virtual filename, at least the same filename as far as the individual users are concerned. The actual filename on the preferred FileDelivery™ server 152 is stored in a "Files Table," and a link to that file is stored in the active virtual file system 150. Moreover, a "version control" function can be added to the FileDelivery™ system to make it possible to maintain different versions of the same file.

One further module that can be implemented on top of the FileDelivery™ system is a BugDelivery™ module (not shown). BugDelivery™ is a system for tracking bugs and fixes in the software running on the server site (including third party application software, for example). BugDelivery™ will automatically notify responsible engineers (and/or the systems administrator) when a bug is reported, and will notify the customer support (likely including the systems administrator) and customers when a patch exists for a known bug.

When a user uploads a file to the FileDelivery™ server 152, the file is physically stored on the hard disk drive of the server 152. The location or directory is based upon a setting in the database 154 and also the username of the virtual folder where the file is being uploaded to. If a file already exists having the same filename, a unique filename is generated for that file, at least with respect to the FileDelivery™ server operating system 152. The user does not see this unique filename, but instead is only shown the "Display Name" of the file that is stored in the database 154. This "Display Name" is the filename that was selected for uploading. As noted above, the actual filename on the hard disk drive of the FileDelivery™ server 152 is stored in a "Files Table," and a link to that file is stored in the active virtual file system 150.

Referring now to FIG. 13, a flow chart is depicted showing the "Module Management" function of the Modules component 170. Starting at a step 550, the Module Management function is entered, after which a decision step 552 determines if the current user is the administrator. If the answer is NO, then access is denied to the Module Management function at a step 554.

If the result at step 552 was YES, then a step 556 allows the installation of new modules by the administrator. Each module has its own object or set of objects. For example, the "Files" module has a "Files" object. A module exists to facilitate the creation and management of a specific object. The preferred FileDelivery™ system "Modules" functionality can be turned on or off for each user, or for the entire site, which is configurable by the administrator. It is preferred that all modules in the FileDelivery™ system follow a standard framework.

Figure 14:
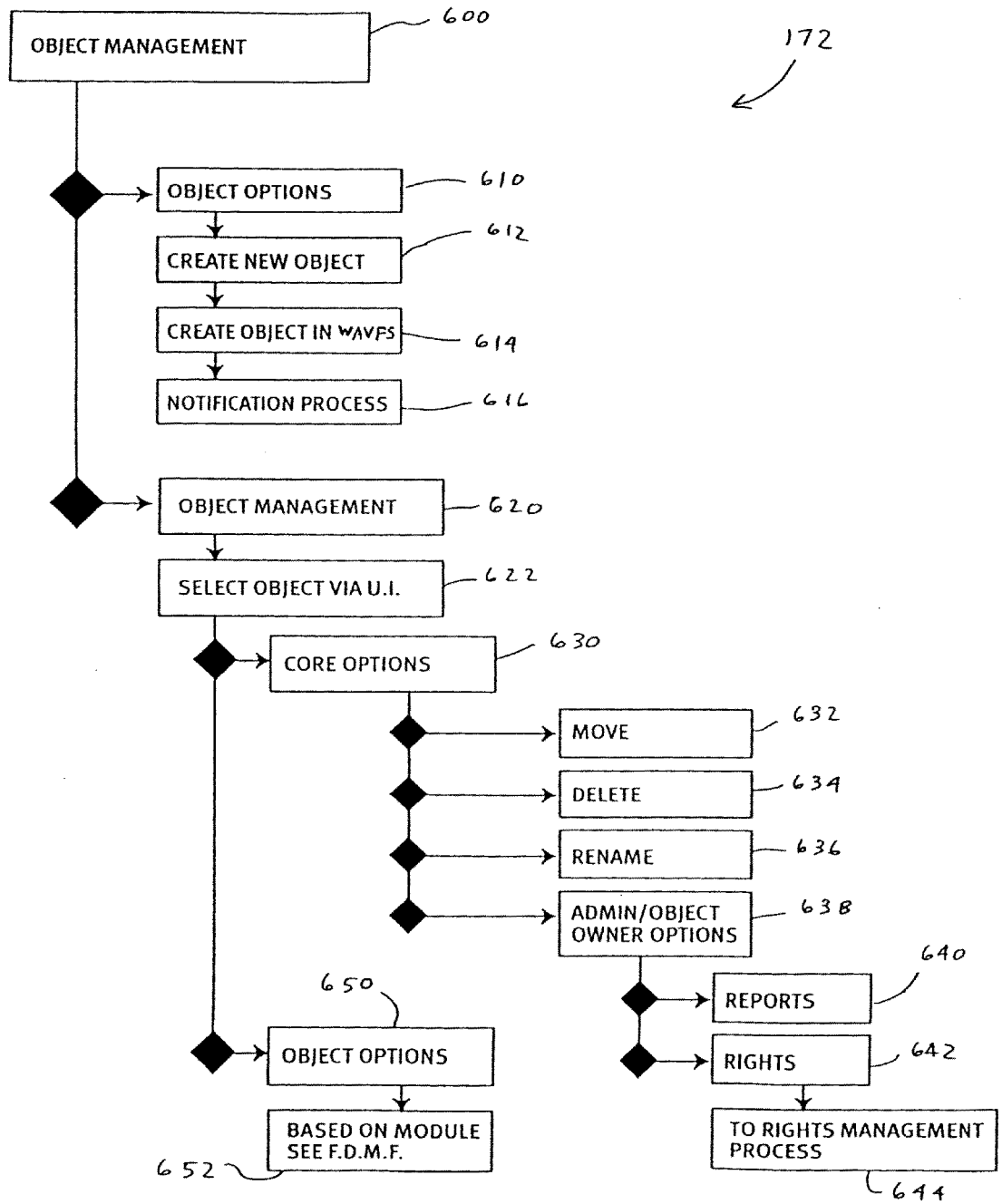
FIG. 14 is a flow chart illustrating some of the choices made available when performing Object Management functions, using the web-based active virtual file system of FIG. 2.

FIG. 14 is a flow chart showing the choices made available to a user or the systems administrator upon entering the "Object Management" function of the Objects component 172. Objects are the core entities in a "Folder Window," and objects are a clickable combination of icons and text. When a user clicks an object in the Folder Window, its properties are displayed in the window on the right. For example, on FIG. 4, the Folder Window is illustrated at 260, and the window on the right is generally designated by the reference numeral 262. Objects have their own set of properties that are fully configurable by the user. There is at least one object for each module that can be developed. Examples of objects are files, events, calendars, tasks, and URL's.

Referring back to FIG. 14, a step 600 is the initial step of "Object Management." After arriving at step 600, several options are made available to the user via the user interface on the monitor screen. One option is the "Object Options" at a step 610, and another option is the "Object Management" at a step 620.

Assuming the Object Options step 610 was chosen by the user or systems administrator, a step 612 allows a new object to be created. A step 614 now creates the object in the active virtual file system 150. After that has been accomplished, a step 616 performs an Automatic Notification process, similar to the E-mail messages as discussed hereinabove. In this situation, the fact that a new object has been created is the triggering event that causes the Auto-notification to occur.

If the "Object Management" option was selected at 620, a step 622 selects an object via the user interface that is displayed on the monitor screen, such as the Folder Window 260 on FIG. 4. Once a particular object has been selected by the user or systems administrator, two choices become available, including a "Core Options" function at a step 630, and an "Object Options" function at a step 650. If the Object Options step 650 is selected by the user or administrator, a step 652 is executed, however, this is based upon the type of module. Depending on the module, this next step in the logic could be virtually anything.

If the "Core Options" choice was selected at step 630, then certain further choices are made available to the user or systems administrator. These basic choices include "Move" at a step 632, "Delete" at a step 634, "Rename" at a step 636, or a further set of options relating to the objects can be selected at a step 638. If the Move, Delete, or Rename functions were chosen, then the selected objects will undergo one of those choices.

If the further Object Options at step 638 is chosen, then further choices are presented to the user or administrator. These choices are for "Reports" at a step 640, or for "Rights" at a step 642. The Reports are configurable by the owner or the systems administrator. If the Rights function at step 642 was chosen, then a step 644 is executed to take the logic flow to the "Rights Management" procedures.

Figure 15:
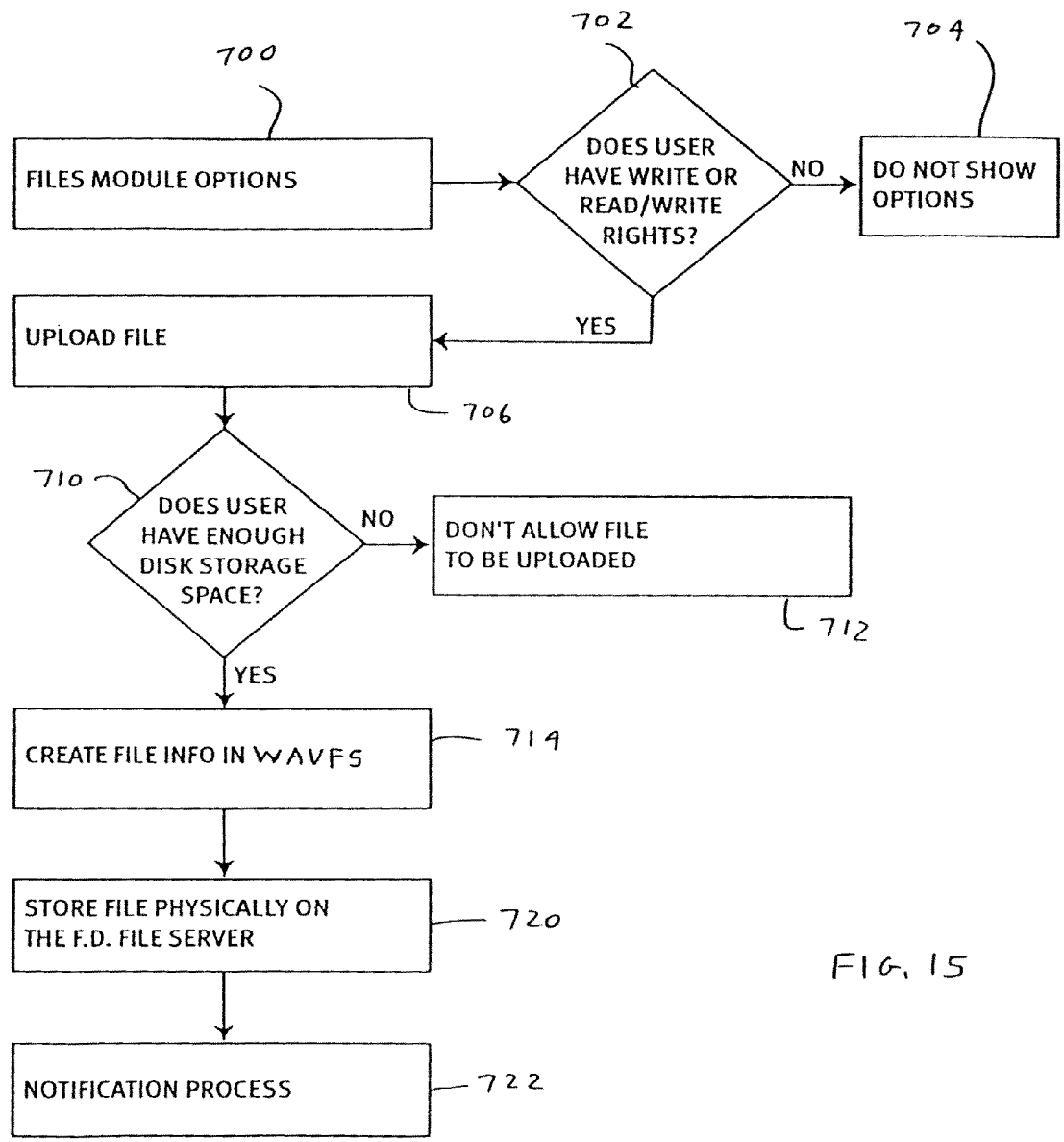
FIG. 15 is a flow chart showing some of the important logical operations for an example in which a "files module" is utilized, using the web-based active virtual file system of FIG. 2.

FIG. 15 is a flow chart illustrating the important logical operations that occur when the "Files Module" options are selected. The initial step is designated by the reference numeral 700, after which a decision step 702 determines whether or not the user has Write or Read/Write rights. If not, then a step 704 refuses to show any options to this particular user.

If the result at decision step 702 was YES, then a step 706 uploads the file from the user's computer to the active virtual file system 150 of the present invention. After that occurs, a decision step 710 determines whether or not the user has enough disk storage space allocated within the hard disk drive of the FileDelivery™ server 152. If the answer is NO, then a step 712 refuses to allow the file to be uploaded.

If there is enough disk storage space available for this user, then a step 714 creates file information in the active virtual file system 150. A step 720 now physically stores the file on the FileDelivery™ server's hard disk drive at 152. The final step in this sequence is 722 where an Automatic Notification process is initiated, which sends an E-mail message to predetermined users regarding the fact that a new file has been uploaded onto the hard disk drive of the FileDelivery™ server 152.

Figure 16:
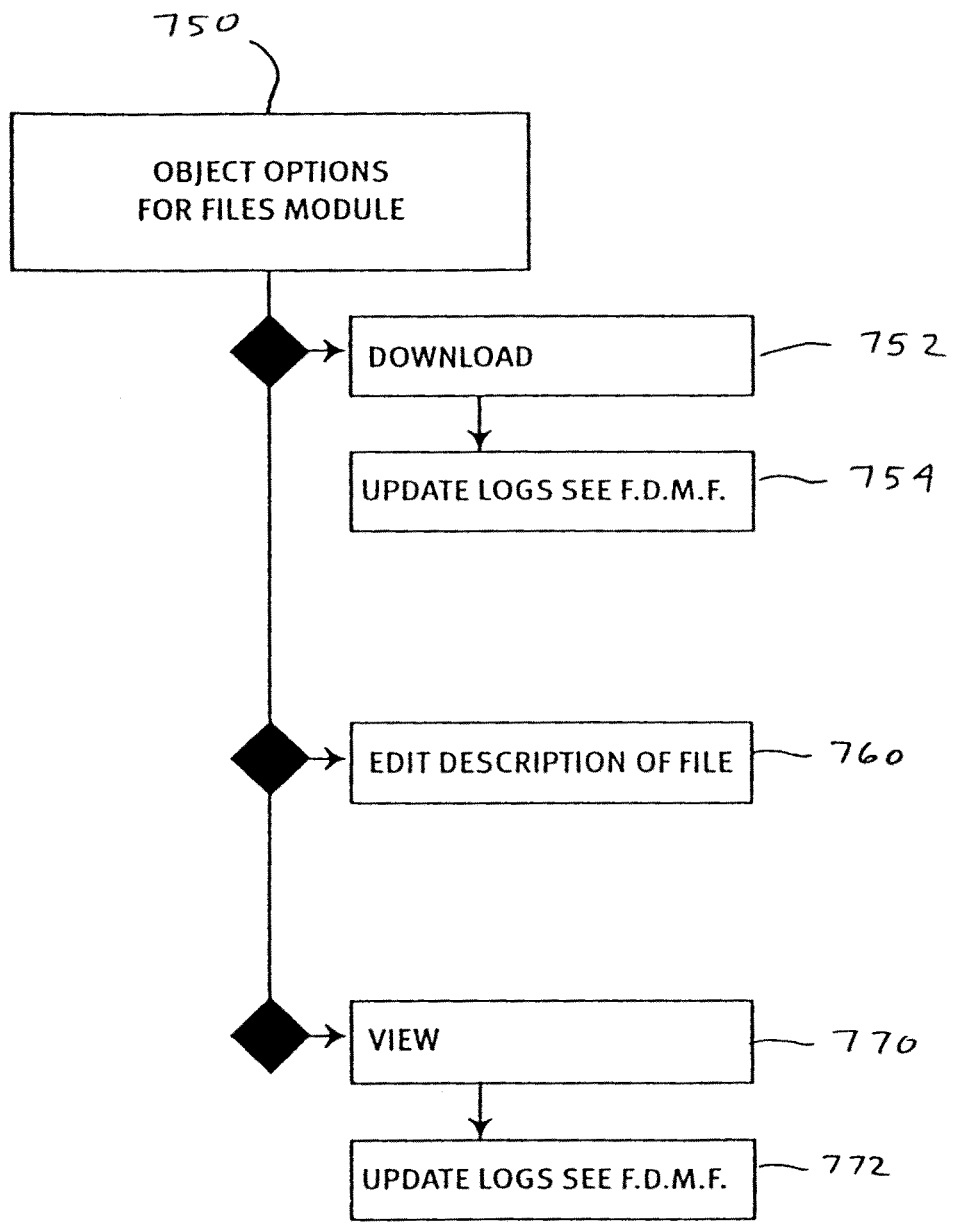
FIG. 16 is a flow chart showing some of the important choices made available in an example of using options relating to objects, using the web-based active virtual file system of FIG. 2.

FIG. 16 is a flow chart showing some of the choices that are presented to the user or systems administrator when the "Object Options" choice at step 650 on FIG. 14 is selected. A step 750 is the initial step in which the Object Options are selected for the "Files" module. A few choices are now presented to the systems administrator or user, including a "Download" function at a step 752, or a choice where the description of a file can be edited at a step 760, or a "View" function at a step 770.

If the Download function is selected at 752, then a step 754 updates the logs of the active virtual file system 150. In some situations, this may initiate an Automatic Notification message, although that is not necessarily required. Similarly, if the View step 770 was selected, then the logs are updated on the active virtual file system 150 at a step 772. Again, it is possible to initiate an Automatic Notification message based upon this event, if desirable.

In conclusion, the preferred FileDelivery™ server 152 is a web-based active virtual file system (WAVFS) that allows for sharing of critical information such as files, calendars, contacts, reports, E-mail, etc. over the Internet. The WAVFS 150 acts as a centralized server and uses secure Internet protocols. Customized modules can easily be added to solve business needs for E-commerce back-end solutions, web site maintenance intranets, legacy database query tools, for example, as well as other applications. The present invention can be used over a Wide Area Network (WAN) just as easily as it can be used over a LAN. The Auto-notification feature of the preferred FileDelivery™ server insures that users are virtually immediately notified of appropriate site activity at a FileDelivery™ site. The preferred active virtual file system of the present invention is based upon open standards and protocols, such as TCP/IP, HTTP, and SSL, without the use of proprietary protocols.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The invention claimed is:

1. The method for operating a computerized active file system, comprising:
   providing a file server having a memory circuit for storing data, a communications port for transmitting and receiving data over a network, and a processing circuit that controls the flow of data between said memory circuit and said communications port, said file server treating server predetermined data groups as single file entities, and automatically causing a notification message to be sent to said network upon the occurrence of at least one predetermined triggering event pertaining to the operation of said file server, wherein said at least one predetermined triggering event and its associated type and content of automatic notification message are configurable under the control of an auto-notification computer program routine residing on said computerized active file system; and
   (1) providing access to at least two users that are in communication with said file server over said network; and
   (2) storing more than one single file under an identical virtual filename as presented to said at least two users as a Display Name, while storing said more than one single file under unique actual filenames in a Files Table contained within said memory circuit along with a link to a location of said more than one single file in a virtual folder, wherein said location is based upon: (a) a setting in a database and (b) a username of the virtual folder where the file is being uploaded to with said file server.

* * * * *